(12) United States Patent
Zabeck et al.

(10) Patent No.: US 12,088,049 B2
(45) Date of Patent: Sep. 10, 2024

(54) HIGH CURRENT CONTACT DEVICE

(71) Applicant: TE Connectivity Germany GmbH, Bensheim (DE)

(72) Inventors: Sebastian Zabeck, Speyer (DE); Alexander Mueller, Speyer (DE); Sandeep Giri, Speyer (DE); Philipp Kowarsch, Bensheim (DE); Dominik Heiss, Bensheim (DE); Tobias Meissner, Bensheim (DE)

(73) Assignee: TE Connectivity Germany GmbH, Bensheim (DE)

( * ) Notice: Subject to any disclaimer, the term of this patent is extended or adjusted under 35 U.S.C. 154(b) by 475 days.

(21) Appl. No.: 17/351,591

(22) Filed: Jun. 18, 2021

(65) Prior Publication Data

US 2021/0399503 A1   Dec. 23, 2021

(30) Foreign Application Priority Data

Jun. 23, 2020   (DE) ...................... 10 2020 116 533.1

(51) Int. Cl.
| | | |
|---|---|---|
| *H01R 13/66* | (2006.01) | |
| *G01K 1/14* | (2021.01) | |
| *H01R 13/52* | (2006.01) | |

(52) U.S. Cl.
CPC ........... *H01R 13/6683* (2013.01); *G01K 1/14* (2013.01); *H01R 13/521* (2013.01)

(58) Field of Classification Search
CPC .. H01R 13/6683; H01R 13/521; H01R 12/58; H01R 13/436; H01R 2201/26;

(Continued)

(56) References Cited

U.S. PATENT DOCUMENTS

| | | | | |
|---|---|---|---|---|
| 2019/0293493 | A1* | 9/2019 | Meissner | .................. G01K 1/18 |
| 2021/0336393 | A1* | 10/2021 | Zhao | .................. H01R 13/5845 |
| 2022/0294153 | A1* | 9/2022 | Schwan | ............... H01R 13/521 |

FOREIGN PATENT DOCUMENTS

| | | | | |
|---|---|---|---|---|
| CN | 105977657 A | * | 9/2016 | ............... H01R 4/40 |
| DE | 10 2016 107 401 A1 | | 8/2017 | |
| WO | WO-2016020133 A1 | * | 2/2016 | ............ B60L 3/0023 |

OTHER PUBLICATIONS

Machine Translation DE 102016107401 A1, (Aug. 31, 2017) (Year: 2023).*

(Continued)

*Primary Examiner* — Travis S Chambers
(74) *Attorney, Agent, or Firm* — Barley Snyder

(57) ABSTRACT

A high current contact device for transmitting electric energy includes a contact housing, a first contact element arranged in the contact housing, the first contact element extends at least in portions along a mating axis, and a temperature measuring device having a circuit carrier with a first temperature sensor and a first heat conducting path. The first temperature sensor is arranged on the circuit carrier and the circuit carrier is arranged laterally adjacent to the first contact element. The first heat conducting path has a first heat conducting element that is elastic and heat conductive with a contact surface. The contact surface abuts against a first outer circumferential side of the first contact element. The first heat conducting element thermally couples the first contact element to the first temperature sensor. The first temperature sensor measures a temperature of the first contact element.

21 Claims, 17 Drawing Sheets

(58) Field of Classification Search
CPC .......... H01R 13/03; G01K 1/14; G01K 1/026; B60L 53/16; B60L 53/302; Y02T 10/70; Y02T 10/7072; Y02T 90/12; Y02T 90/14
See application file for complete search history.

(56) References Cited

OTHER PUBLICATIONS

Machine Translation WO 2016020133 A1, (Feb. 11, 2016) (Year: 2023).*
Machine Translation of CN 105977657-A, Sep. 28, 2016 (Year: 2024).*

\* cited by examiner

HIGH CURRENT CONTACT DEVICE

CROSS-REFERENCE TO RELATED APPLICATIONS

This application claims the benefit of the filing date under 35 U.S.C. § 119(a)-(d) of German Patent Application No. 102020116533.1, filed on Jun. 23, 2020.

FIELD OF THE INVENTION

The present invention relates to a contact device and, more particularly, to a high current contact device.

BACKGROUND

A plug device insert which contains contact elements such as contact pins for conducting electric current is known from DE 10 2016 107 401 A1. The contact elements contain a contact region, in which they touch complementary contact elements, and a connection region, in which a conductor is connected. The temperature of at least one contact element is detected in a measuring region which lies between the contact region and the connection region.

SUMMARY

A high current contact device for transmitting electric energy includes a contact housing, a first contact element arranged in the contact housing, the first contact element extends at least in portions along a mating axis, and a temperature measuring device having a circuit carrier with a first temperature sensor and a first heat conducting path. The first temperature sensor is arranged on the circuit carrier and the circuit carrier is arranged laterally adjacent to the first contact element. The first heat conducting path has a first heat conducting element that is elastic and heat conductive with a contact surface. The contact surface abuts against a first outer circumferential side of the first contact element. The first heat conducting element thermally couples the first contact element to the first temperature sensor. The first temperature sensor measures a temperature of the first contact element.

BRIEF DESCRIPTION OF THE DRAWINGS

The invention will now be described by way of example with reference to the accompanying Figures, of which.

DETAILED DESCRIPTION OF THE EMBODIMENT(S)

Reference is made to a coordinate system in the following figures. By way of example, the coordinate system is designed as a right-hand system and has an x axis (longitudinal direction), a y axis (transverse direction) and a z axis (vertical direction).

Figure 1:
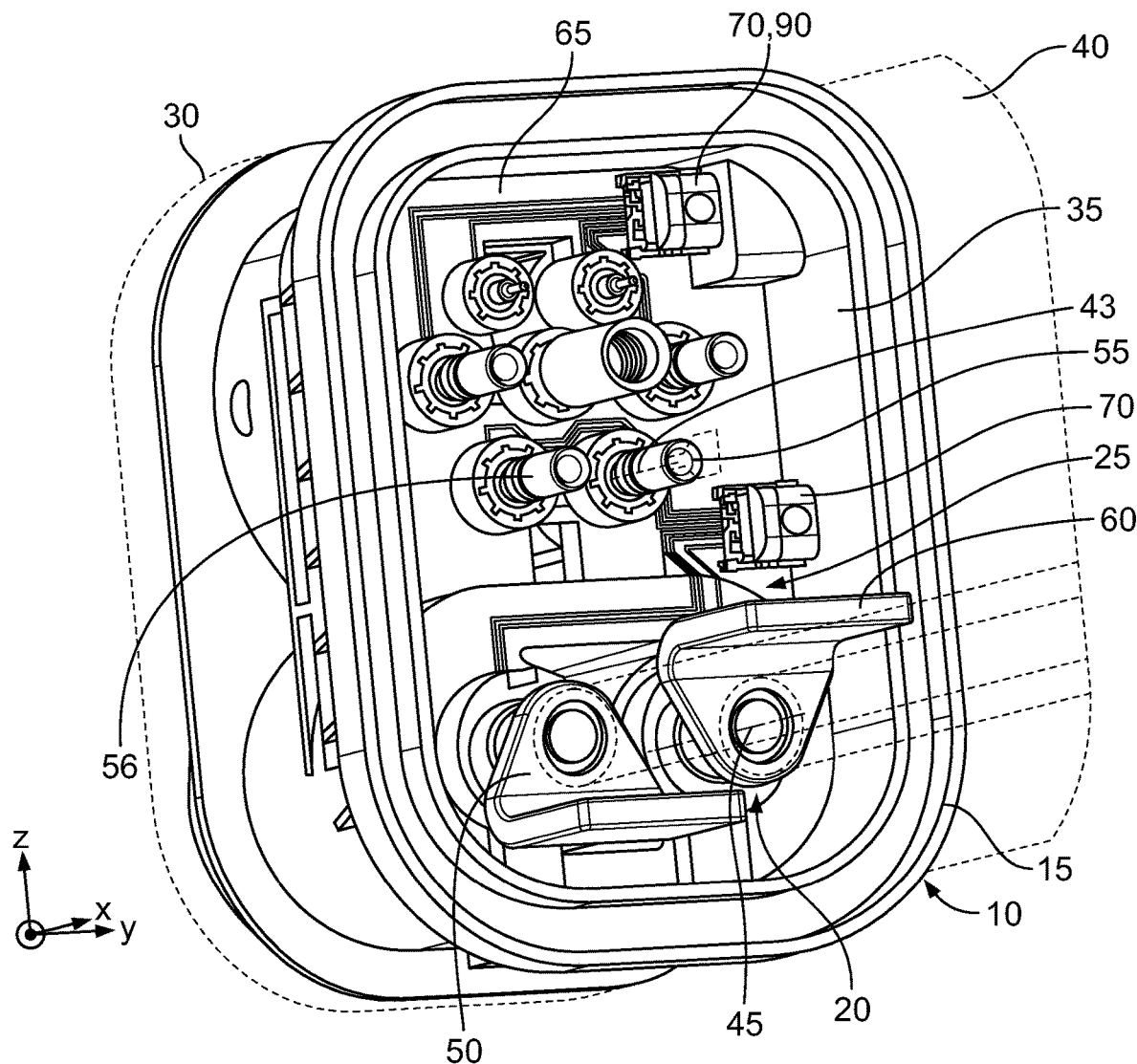
FIG. 1 is a perspective view of a high current contact device according to a first embodiment.

FIG. 1 shows a perspective illustration of a high current contact device 10 according to a first embodiment. The high current contact device 10 has a contact housing 15, at least a first contact element 20 arranged in the contact housing 15, and a temperature measuring device 25.

The high current contact device 10 is designed to establish contact with a further high current contact device 30. In FIG. 1, the further high current contact device 30 is illustrated schematically, indicated by a dashed line. The further high current contact device 30 is arranged on a side which is remote from the observer.

The high current contact device 10 and the further high current contact device 30 can be designed in a sealed manner, so that the entry of moisture, liquid and/or other corrosive media into a housing interior 35 of the contact housing 15 is prevented.

On a side facing the observer in FIG. 1, for example, the high current contact device 10 can be connected to a high current cable 40, which is connected, for example, to an electric energy store, a drive motor of a motor vehicle or a control device. Alternatively, the high current contact device 10 can also be connected to a connection rail. The high current cable 40 can also be connected to a charging device for supplying a charging current for charging the electric energy store.

In the embodiment shown in FIG. 1, the first contact element 20 extends linearly along a mating axis 45. The mating axis 45 is aligned such that it extends parallel to the x axis. The high current contact device 10 can additionally have at least one second contact element 50. The second contact element 50 is arranged such that it is spaced from the first contact element 20 in a direction perpendicular to the mating axis 45. The first contact element 20 and the second contact element 50 can be designed differently or, as shown in FIG. 1, identically to one another. The second contact element 50 is also arranged in the housing interior 35, like the first contact element 20.

The high current contact device 10 can additionally have further contact elements 55 in the housing interior 35, wherein the number of contact elements 20, 50, 55 arranged in the housing interior 35 is substantially only limited by the installation space of the housing interior 35. By way of example, the further contact element 55 is designed differently to the first contact element 20 in FIG. 1.

The first contact element 20, in the shown embodiment, is designed by way of example as a pin contact and serves for establishing electrical contact with a mating contact 60, which is designed, for example, as a socket contact. The mating contact 60 is covered in FIG. 1. The first contact element 20 is furthermore designed to transmit electric energy to the mating contact 60. In this case, the first contact element 20 is designed to transmit an electric current of at least 30 amperes to 1000 amperes, or 50 to 500 amperes, over a time period of at least 30 seconds.

The electric energy transmitted via the first contact element 20 can be used, for example, to supply the electric drive motor of the motor vehicle with electric energy. The electric energy can also be used to charge the electric energy store of the motor vehicle with electric energy. The electric energy can be provided, for example, via recuperation or from a stationary electric energy network.

In an embodiment, the first contact element 20 is connected by way of example to a first electrical pole and the second contact element 50 is connected to a second electrical pole of a direct voltage energy source, for example to the electric energy store or a charging station, wherein the contact housing 15 and the circuit carrier 65 electrically insulate the contact elements 20, 50, 55 from one another. A voltage applied between the first contact element 20 and the second contact element 50 can be between 48 V and 500 V, for example, and therefore differs considerably from the conventional 12 V or 24 V network of the motor vehicle.

During the transmission of electric energy by the high current cable 40 via the first contact element 20 and the mating contact 60, the first contact element 20 heats up as a result of its ohmic internal resistance and an ohmic contact resistance of the first contact element 20 to the mating contact 60.

In the embodiment shown in FIG. 1, by way of example, the further contact element 55 is designed differently to the first and second contact element 20, 50. The further contact element 55 is altered with respect to the first contact element 20 in that the further contact element 55 has a reduced outer diameter compared to the first contact element 20. The functional design of the second contact element 50 and the further contact element 55 is, however, identical to the functional design of the first contact element 20, so that explanations presented below within the context of the first contact element 20 likewise apply to the second contact element 50 and also to the further contact element 55. If there are any deviations between the first contact element 20 and the second contact element 50, this will be mentioned explicitly below. In this regard, for example, the first and second contact element 20, 50 can serve to transmit a direct current, whilst an alternating current is transmitted by the further contact element 55.

The temperature measuring device 25 is arranged in the housing interior 35 of the contact housing 15, as shown in FIG. 1. The temperature measuring device 25 has at least one circuit carrier 65. The circuit carrier 65 can be designed as a printed circuit board. In an embodiment, the circuit carrier 65 is designed as an injection molded circuit carrier, which is generally also known as a molded integrated device (MID).

The temperature measuring device 25 has at least one interface 70. By way of example, the temperature measuring device 25 can also have a plurality of interfaces 70, as shown in FIG. 1. The interface 70 can be electrically connected to an evaluating device of the motor vehicle. The interface 70 is arranged on the end face of the circuit carrier 65, on a side facing the observer and the mating contact 60. By way of example, the interface 70 has a contact device 90. The contact device 90 is designed to transmit a data signal.

Figure 2:
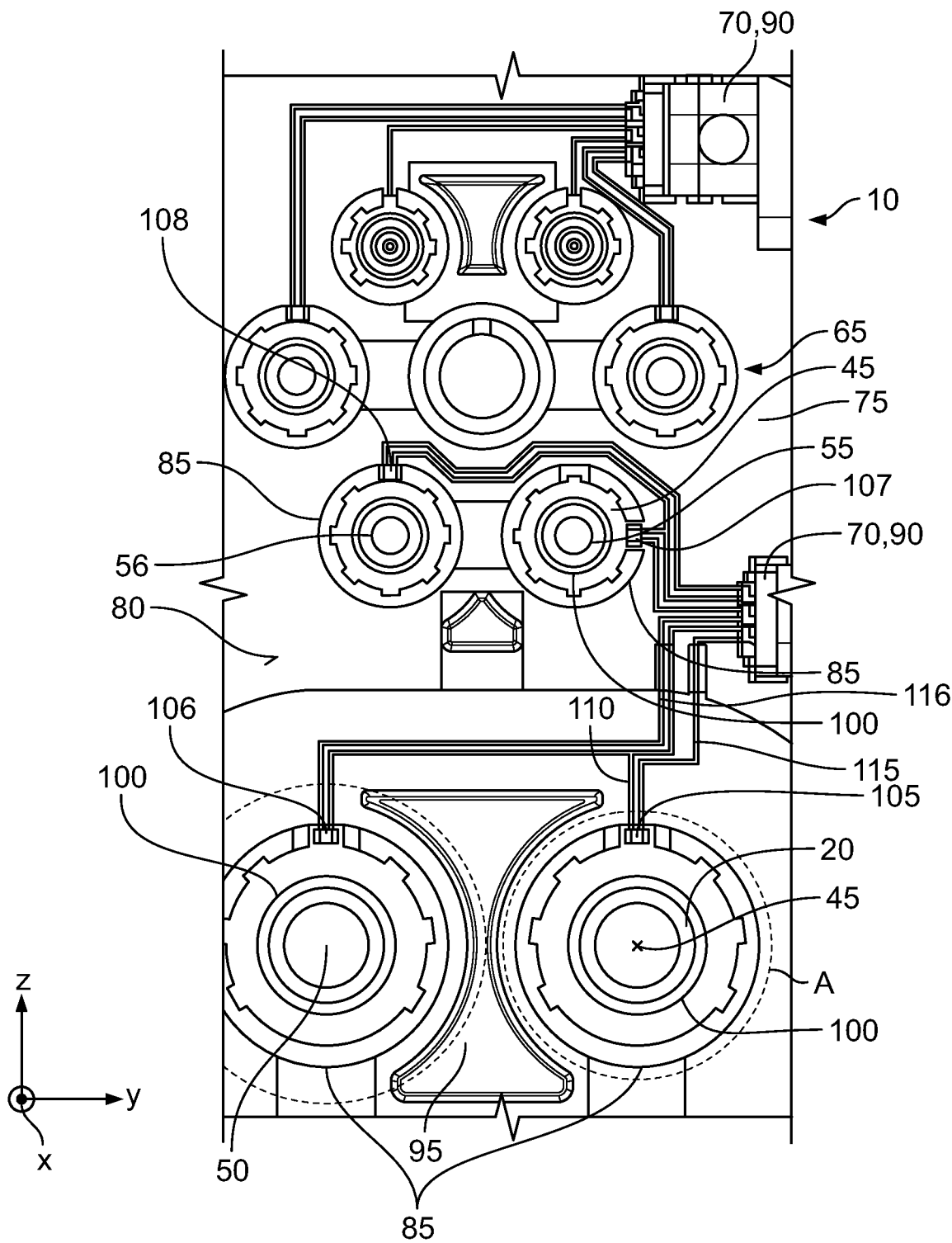
FIG. 2 is a detail plan view of the high current contact device of FIG. 1.

FIG. 2 shows a detail of a plan view of the high current contact device 10 shown in FIG. 1.

As shown in FIG. 2, the circuit carrier 65 has a first carrier 75. The first carrier 75 is electrically insulating and comprises a first matrix material. The first matrix material can comprise plastic, in particular a temperature-stable plastic. The first carrier 75 is designed to be planar on a first end face 80 facing the further high current contact device 30. The first carrier 75 additionally has at least one reinforcing portion 85 on the first end face 80, which reinforcing portion 85 is designed by way of example in the form of a ring and projects over the first end face 80. In an embodiment, a respective reinforcing portion 85 is provided for each contact element 20, 50, 55. The interface 70 is also arranged on the first end face 80.

A separating web 95 of the first carrier 75 can furthermore be formed between the first and second contact element 20, 50 arranged in pairs, as shown in FIG. 2. The separating web 95 projects beyond the first end face 80 in the x direction. In an embodiment, the first carrier 75, the reinforcing portion 85, and the separating web 95 are manufactured in one piece and from the same material, for example in an injection molding process.

The first carrier 75 has a respective feedthrough 100 for each of the contact elements 20, 50, 55, as shown in FIG. 2. The feedthrough 100 is designed in the manner of a bore. The feedthrough 100 extends along the mating axis 45.

In the embodiment shown in FIG. 2, the number of contact elements 20, 50, 55 corresponds to a number of feedthroughs 100. In this case, each of the feedthroughs 100 has one of the contact elements 20, 50, 55 extending through it in each case. An inner diameter of the feedthrough 100 can be selected so that the contact element 20, 50, 55 extends through the respectively associated feedthrough 100 with substantially no radial gap. In particular, the contact element 20, 50, 55 can be pressed into the feedthrough 100. The first carrier 75 holds the respectively associated contact element 20, 50, 55 mechanically by the reinforcing portion 85 on the feedthrough 100. The first carrier 75 furthermore electrically insulates the contact elements 20, 50, 55 from one another, which contact elements are each arranged offset from one another in the feedthroughs 100.

As shown in FIG. 2, the temperature measuring device 25 has at least a first temperature sensor 105. By way of example, the temperature measuring device 25 has a second temperature sensor 106 for the second contact element 50. A further temperature sensor 107, 108 can likewise be provided for the further contact elements 55. The first and/or second and/or further temperature sensor 105, 106, 107, 108 can be designed, for example, as an SMD component, in particular, for example, as an NTC element. The first and/or second and/or further temperature sensor 105, 106, 107, 108 is arranged such that it is spaced radially outwards from the respectively associated first and/or second and/or further contact element 20, 50, 55 as seen in relation to the mating axis 45.

The circuit carrier 65 has a first electrical connection 110 and, in the embodiment shown in FIG. 2, a second electrical connection 115. The first and second electrical connection 110, 115 are arranged on the end face of the first carrier 75. The first and second electrical connection 110, 115 electrically connect the first temperature sensor 105 to the interface 70. The circuit carrier 65 furthermore has further electrical connections 116, which electrically connect the second temperature sensor 106 and the further temperature sensor 107, 108 to the interface 70 in each case. The first electrical connection 110, the second electrical connection 115 and/or the further electrical connection 116 are designed, for example, as a trace on the first carrier 75. The first carrier 75 electrically insulates the electrical connections 110, 115, 116 from one another.

In the embodiment, the first electrical connection 110 and the second electrical connection 115 extend over the reinforcing portion 85 and the first end face 80 between the interface 70 and the first temperature sensor 105 such that they are parallel offset from one another without direct contact. The first, second and further electrical connection 110, 115, 116 can be manufactured according to known manufacturing processes for manufacturing injection molded circuit carriers (MIDs).

Figure 3:
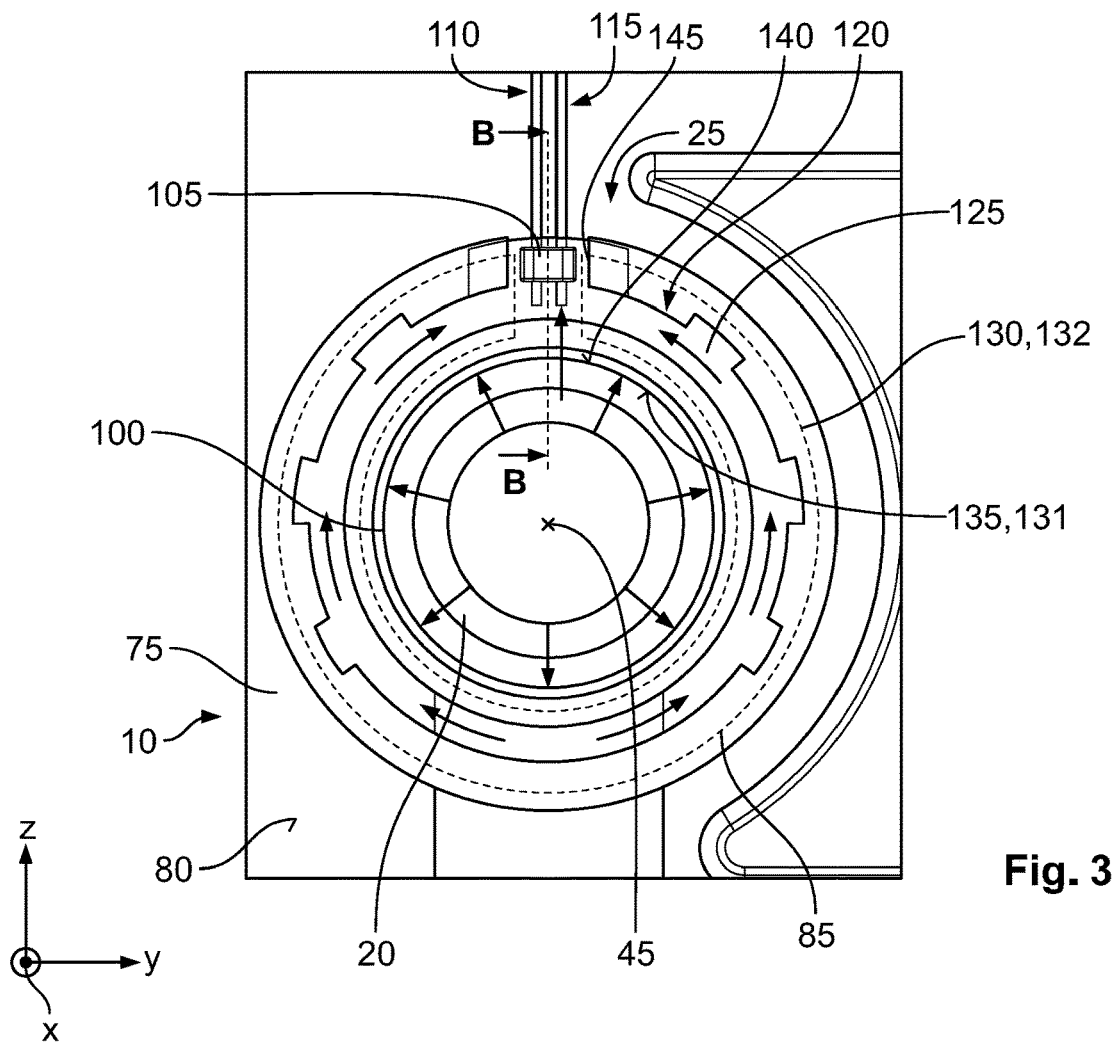
FIG. 3 is a detail plan view of a portion A of FIG. 2.

FIG. 3 shows a detail A of the high current contact device 10 shown in FIG. 2, which detail is marked in FIG. 2. The explanations presented below for the first contact element 20 and the temperature measuring device 25 also apply analogously to the second and further contact element 50, 55 and to the second temperature sensor 106 and the further temperature sensor 107, 108.

In FIG. 3, the first temperature sensor 105 is arranged such that it is spaced from the first contact element 20 on the first carrier 75 with a radial spacing as seen in relation to the mating axis 45. Each of the temperature sensors 105, 106, 107, 108 is thermally connected to the respectively associated contact element 20, 50, 55 by an associated first heat conducting path 120 of the temperature measuring device 25. In this regard, for example, the first temperature sensor 105 is thermally connected to the first contact element 20 by the first heat conducting path 120 of the temperature measuring device 25.

The first heat conducting path 120 has a first heat conducting element 125 and a second heat conducting element 130, which is arranged partially covered by the first heat conducting element 125 in FIG. 3. The first heat conducting element 125 has a substantially hollow cylindrical basic form. The first heat conducting element 125 extends substantially along the mating axis 45.

The first heat conducting element 125 has a contact surface 135 on an inner circumferential side 131 of the first heat conducting element 125, as shown in FIG. 3. At the contact surface 135, the first heat conducting element 125 abuts against a first outer circumferential side 140 of the first contact element 20 and is thermally connected to the first contact element 20.

The hollow cylindrical configuration of the first heat conducting element 125 has the advantage that the contact surface 135 is designed to extend completely around the mating axis 45 on the inner circumferential side 131 of the first heat conducting element 125. The contact surface 135 thus has a particularly large surface area. The contact surface 135 can abut extensively against the first outer circumferential side 140 and seal the housing interior 35 against the environment at the first contact element 20.

In an embodiment, the first heat conducting element 125 is an elastically deformable second matrix material. The second matrix material can comprise, for example, silicone and/or polyurethane and/or polyethylene and/or a thermally temperature-resistant plastic. The first heat conducting element 125 can be elastically deformed in a reversible manner—in particular stretched or squeezed—by at least 10 percent, at least 30 percent, or at least 40 percent, without the second matrix material becoming damaged.

The heat conductivity of the second matrix material can be increased in that a filler material, which is in particle form for example, is embedded in the second matrix material. The filler material can comprise copper and/or aluminum and/or silver and/or aluminum oxide and/or aluminum nitrate and/or silicon oxide and/or silicon nitrate and/or boron and/or boron nitride and/or electrically conducting metal and/or an electrically non-conducting and thermally conductive metal compound, in an embodiment based on iron or non-ferrous metals. The first heat conducting element 125 has at least a heat conductivity of 0.3 W/(m·K) to 2 W/(m·K), in particular 0.3 W/(m·K) to 1.7 W/(m·K). The first heat conducting path 120 thus has an approximate heat conductivity of 0.5-400 W/(m·K). The second heat conducting element 130 is arranged on an end face of the reinforcing portion 85 on a side facing the further high current contact device 30. In particular here, the second heat conducting element 130 is designed as a metallizing layer 132 extending in the form of a part ring around the first contact element 20 as seen in relation to the mating axis 45. The first temperature sensor 105 and the first and second electrical connection 110, 115 are arranged on the reinforcing portion 85 in the region of a break 145 in the second heat conducting element 130. As a result of the break 145, an electrical connection between the first and second electrical connection 110, 115 and to the first temperature sensor 105 is prevented as a result of the electrically insulating first carrier 75.

The second heat conducting element 130 comprises copper and/or aluminum. In an embodiment, the metallizing layer 132 has a layer thickness from and including 15 μm or 20 μm, to and including 400 μm.

Figure 4:
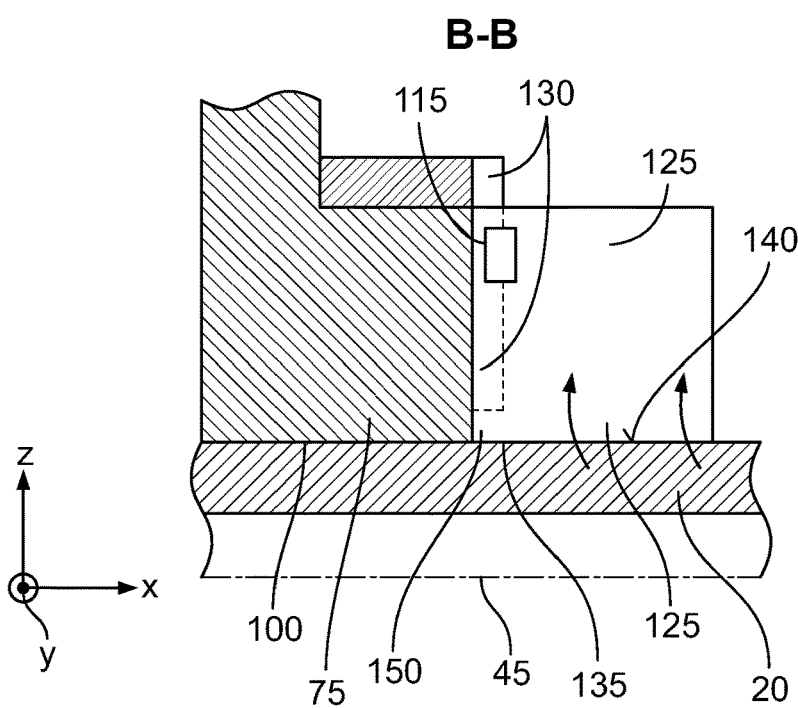
FIG. 4 is a sectional side view through the high current contact device of FIG. 3, along section plane B-B.

FIG. 4 shows a sectional view along a section plane B-B through the high current contact device 10 shown in FIG. 3, which section plane is shown in FIG. 3.

The first heat conducting element 125 is arranged directly adjacent to the first carrier 75 in the region of the break 145. In an embodiment, the first heat conducting element 125 is connected to the first carrier 75 with material fit. On the radially inner side (as seen in relation to the mating axis 45), the first heat conducting element 125 is arranged adjacent to the feedthrough 100.

The first temperature sensor 105 is connected to the second matrix material of the first heat conducting element 125 with material fit. In an embodiment, the first temperature sensor 105 is embedded and molded into the first heat conducting element 125. In this case, embedding is understood to mean that, circumferentially, the first temperature sensor 105 is surrounded substantially completely by the first heat conducting element 125. This can take place by an injection molding procedure, for example. The penetration of moisture into the temperature sensor 105 is thus avoided so that corrosion of the temperature sensor 105 can be prevented. Furthermore, a stray voltage at the temperature sensor, which distorts the temperature measurement, is thus prevented.

To prevent direct contact between the first contact element 20 and the second heat conducting element 130, a (narrow) radial gap 150 shown in FIG. 4 can be provided between the second heat conducting element 130 and the first outer circumferential side 140, wherein the radial gap 150 is filled by the first heat conducting element 125. It would also be possible that, on the radially inner side, the second heat conducting element 130 reaches substantially up to the first outer circumferential side 140 of the first contact element 20. Electrical contact between the second heat conducting element 130 and the first temperature sensor 105 is prevented by the electrically insulating first carrier 75 and the break 145.

In the axial direction as seen in relation to the mating axis 45, the first heat conducting element 125 is designed to be considerably wider than the second heat conducting element 130. For example, in the axial direction, the first heat conducting element 125 has an extent which corresponds to at least half the radial extent of the first contact element 20 in the region of the first heat conducting element 125. In an embodiment, the axial extent is less than or equal to three times the radial extent of the first contact element 20 in the region of the heat conducting element 125. This configuration has the advantage that good mechanical rigidity of the first heat conducting element 125 can be ensured along with good thermal contact between the first heat conducting element 125 and the first contact element 20.

The first contact element 20 heats up if the electric energy (for example in the range of 10 kW to 300 kW) with a high current (for example between 30 A and 500 A) is transmitted via the high current contact device 10 and the further high current contact device 30. To measure the temperature of the first contact element 20, some of the heat of the first contact element 20 is dissipated to the contact surface 135 via the first outer circumferential side 140, wherein the heated first contact element 20 heats the first heat conducting element 125. The heat flow is illustrated symbolically by arrows in FIGS. 3 and 4. As a result of the good heat conductivity of the first heat conducting element 125, the first heat conducting element 125 conveys the first proportion of the dissipated heat to the second heat conducting element 130. A second proportion is conveyed directly via the first heat conducting element 125 to the first temperature sensor 105, which is embedded in the first heat conducting element 125.

As a result of configuring the second heat conducting element 130 in the form of a part ring, the first proportion absorbed by the second heat conducting element 130 is conducted around the first contact element 20 towards the break 145. At the break 145, the first proportion is transferred back to the first heat conducting element 125 by the second heat conducting element 130. As a result of the considerably higher heat conductivity of the second heat conducting element 130, the first proportion of heat is conveyed particularly quickly towards the break 145.

Since the break 145 is designed to be narrow so that the break 145 is merely able to accommodate the first temperature sensor 105 and the first and second electrical connection 110, 115, the thermal path between an end at the break 145 of the second heat conducting element 130 and the first temperature sensor 105 via the first heat conducting element 125 is particularly short.

The configuration shown in FIGS. 1 to 4 has the advantage that the first temperature sensor 105 is thermally coupled to the first contact element 20 in a particularly effective manner via the first heat conducting path 120. The temperature measuring device 25 is thus particularly suitable for determining the temperature of the first contact element 20 in a dynamic manner.

As a result of embedding the first temperature sensor 105 in the first heat conducting element 125, the first temperature sensor 105 measures the temperature of the first contact element 20 in a particularly precise manner. The first temperature sensor 105 provides information relating to the measured temperature of the first contact element 20 to the interface 70 via the first and second electrical connection 110, 115. The first information can be taken into account by the evaluating device when controlling the electric energy, for example when controlling the charging current or controlling the drive current, which evaluating device is designed, for example, such that is in integrated in a vehicle control device. In particular, a thermal load on the high current contact device 10, 30 can be prevented as a result of the rapid and dynamic measurement of the temperature of the first contact element 20.

As a result of the heat conducting path 120, the temperature sensor 105 does not have to be fastened directly on the contact element 20 but is still thermally coupled to the first contact element 20 in a very effective manner so that the temperature of the first contact element 20 can be dynamically measured in a precise manner. The high current contact device 10 can thus be configured in a geometrically flexible manner. Furthermore, the configuration has the advantage that the temperature can be detected virtually in real time. An early break in the current transmission is thus possible so as to prevent the contact device 10 from becoming destroyed or damaged. Furthermore, it is also possible to identify temperatures in the cryogenic range, for example up to −40°.

With the second temperatures sensor 106 and the further temperature sensor 107, 108 of each of the contact elements 20, 50, 55 shown in FIGS. 1 and 2, the temperature measuring device 25 measures a temperature of the second and further contact element 50, 55 in each case. The temperature sensors 106, 107 each provide the correspondingly measured temperature to the interface 70 as second information.

Figure 5:
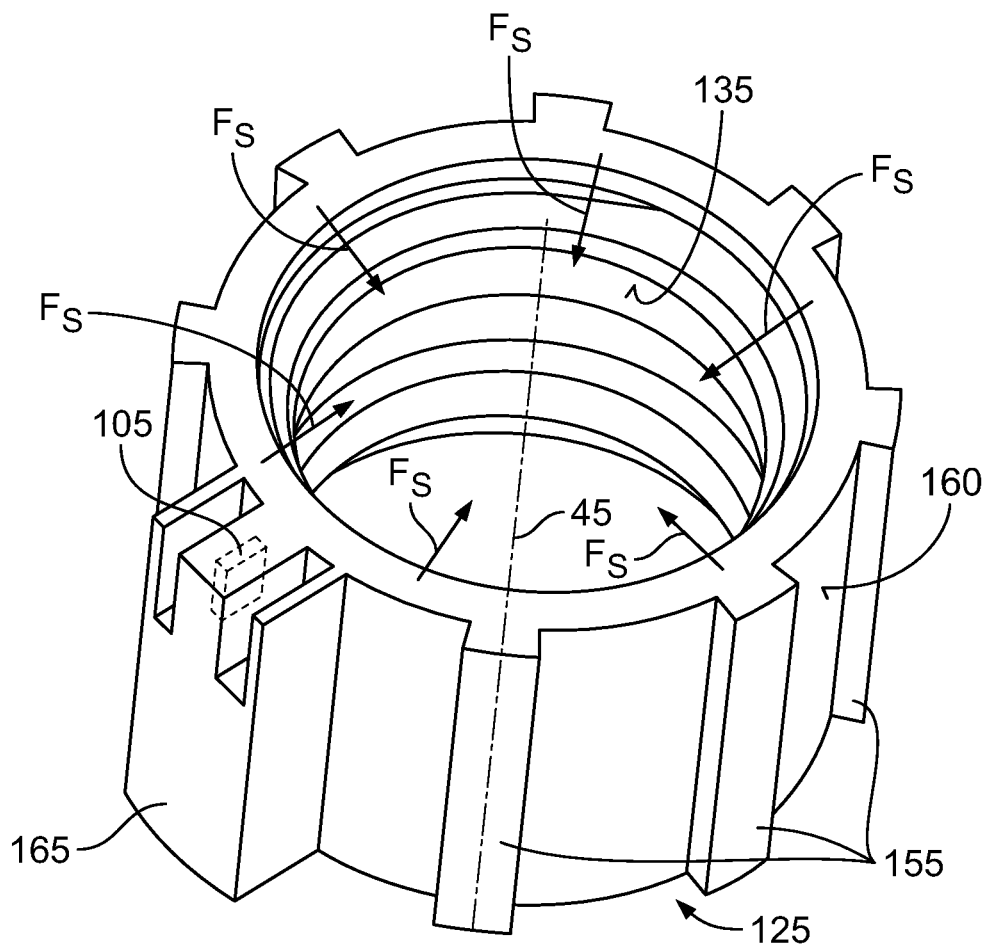
FIG. 5 is a perspective view of a first heat conducting element of the high current contact device of FIGS. 1 to 4.

FIG. 5 shows a perspective illustration of the first heat conducting element 125 of the high current contact device 10 shown in FIGS. 1 to 4. The first heat conducting element 125 has, by way of example, at least one, and in an embodiment several, first supporting webs 155 arranged offset from one another in the circumferential direction as seen in relation to the mating axis 45. The first supporting web 155 extends linearly along the mating axis 45 and has a substantially constant cross-section in the axial direction as seen in relation to the mating axis 45. The first supporting web 155 extends from radially inwards to radially outwards. In this case, the first supporting web 155 is arranged radially on a side of the first heat conducting element 125 which is remote from the contact surface 135 as seen in relation to the mating axis 45. The remote side corresponds to a second outer circumferential side 160 of the first heat conducting element 125.

In addition, as shown in FIG. 5, a second supporting web 165, which is arranged offset from the other, first supporting webs 155 in the circumferential direction, is designed to be wider than the first supporting web 155 in the circumferential direction. The second supporting web 165 overlaps the break 145 in the axial direction, wherein the first temperature sensor 105 is embedded in the second supporting web 165. An overlap is understood to mean that, with the projection of two components, e.g. the break 145 and the second supporting web 165 in the axial direction into a projection plane perpendicular to the mating axis 45, these components overlap one another in the projection plane. In this case, the second supporting web 165 can be designed to be wider than the first supporting web 155 in both the radial and the circumferential direction.

The mechanical function of the supporting web 155, 165 is such that the first heat conducting element 125 is designed in a particularly stable manner. In particular, the first heat conducting element 125 is prevented from fracturing when the first contact element 20 is inserted through the feedthrough 100 and the first heat conducting element 125. Furthermore, an outer surface of the first heat conducting element 125 is increased so that, during cooling, for example as a result of a reduction in the electric energy to be transmitted via the first contact element 20, heat can be given off particularly quickly to the environment of the first heat conducting element 125. The temperature of the contact element 20, 50, 55 can thus also be measured by the temperature sensor 105, 106, 107, 108 in a particularly precise manner when the electric energy to be transmitted decreases.

In an embodiment, in the dismantled state of the contact element 20, 50, 55, the contact surface 135 has a smaller radial extent as seen in relation to the mating axis 45 than the first outer circumferential side 140 of the contact element 20, 50, 55. If the contact element 20, 50, 55 is inserted through the feedthrough 100 during the assembly of the high current contact device 10, the contact element 20, 50, 55 expands and is elastically deformed, in particular tensioned. If the contact element 20, 50, 55 is located in its final position, the pre-tensioned first heat conducting element 125 presses the contact surface 135 against the first outer circumferential side 140 with a radially inward tensioning force Fs acting towards the mating axis 45. A particularly good thermal contact between the first heat conducting element 125 and the contact element 20, 50, 55 is thus ensured. Furthermore, the housing interior 35 is thus reliably sealed at the contact element 20, 50, 55 by the first heat conducting element 125.

Figure 6:
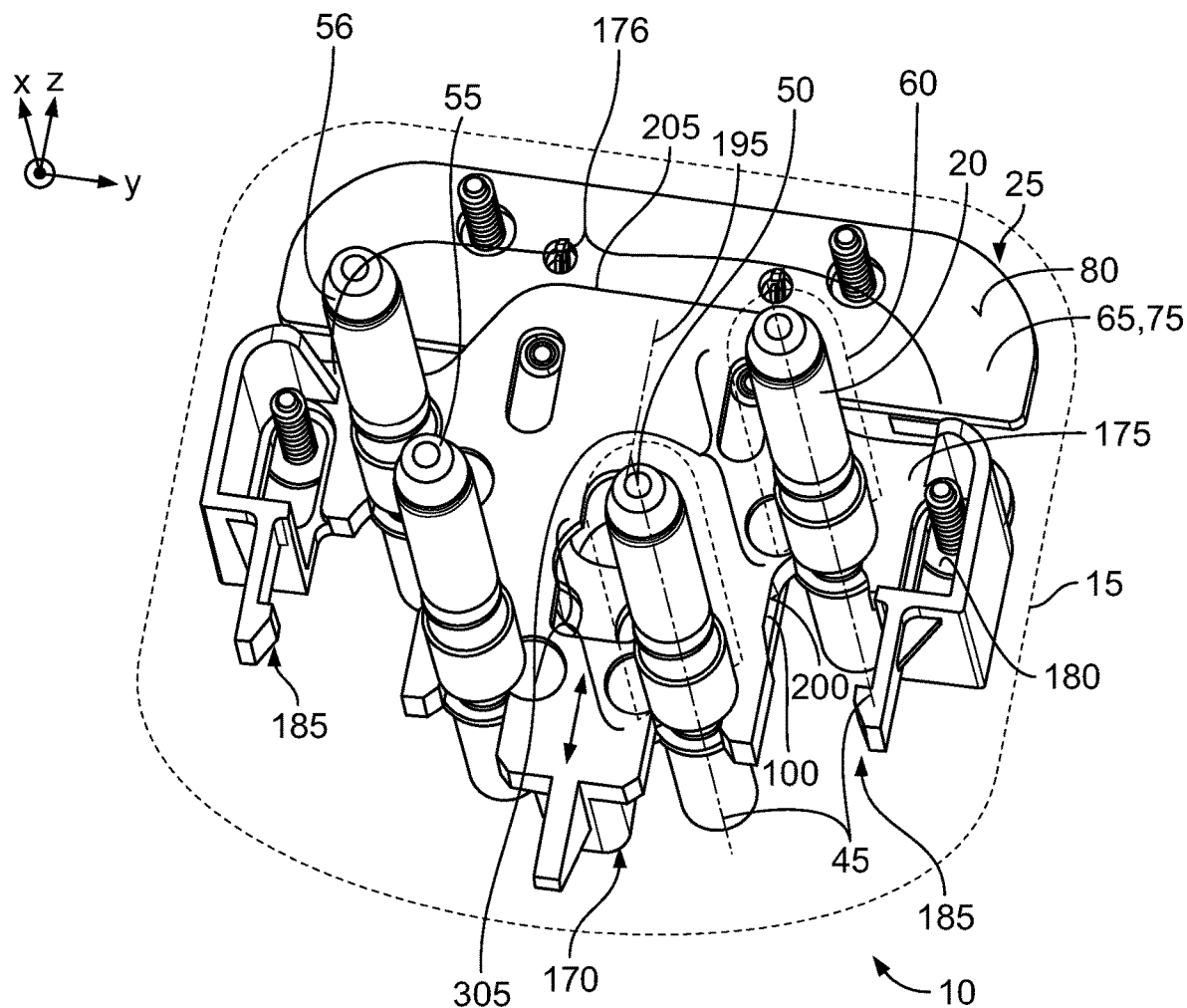
FIG. 6 is a perspective view of a high current contact device according to a second embodiment.

FIG. 6 shows a perspective illustration of a high current contact device 10 according to a second embodiment. The high current contact device 10 is designed substantially identically to the high current contact device 10 shown in FIGS. 1 to 5. Only the differences of the high current contact device 10 shown in FIG. 6 compared to the high current contact device 10 shown in FIGS. 1 to 5 are discussed below.

For reasons of clarity, the contact housing 15 is merely illustrated schematically by a dashed line in FIG. 6. The number of illustrated contact elements 20, 50, 55 is reduced compared to the first embodiment shown in FIGS. 1 to 5. Furthermore, by way of example, the contact elements 20, 50, 55 are designed identically to one another. By way of example, the contact element 20, 50, 55 is designed, for example, as a pin contact.

By way of example, the circuit carrier 65 is designed as a printed circuit board and is screwed to the contact housing 15. To secure an axial position in relation to the mating axis 45 of the contact element 20, 50, 55, the high current contact device 10 has a contact securing device 170. The contact securing device 170 can be designed as a secondary contact securing device, for example.

As shown in FIG. 6, the contact securing device 170 has a second carrier 175, wherein the second carrier 175 is designed to be substantially planar in a sub-region 176 on a side facing the observer and a contact region 305 of the contact element 20, 50, 55 and extends in an yz plane. The contact element 20, 50, 55 establishes electrical contact with the corresponding mating contact 60 by the contact region 305. The second carrier 175 is displaceable between a first position and a second position along a displacement axis 195. The second position is illustrated in FIG. 6 and corresponds to a locking position. In the second position, the contact element 20, 50, 55 is prevented from being removed or displaced axially in relation to the mating axis 45 by the second carrier 175.

To fasten the second carrier 175, the second carrier 175 can be screwed to the contact housing in the second position by a screw connection 180, for example, as shown in FIG. 6. A latching device 185, for example a latching lug, can be additionally provided on the second carrier 175, wherein the latching device 185 is designed to engage in a recess of the contact housing 15, for example, in order to fasten the second carrier 175 on the contact housing 15 in the second position (locking position).

Deviating from the configuration shown in FIGS. 1 to 5, the second carrier 175 has the feedthrough 100 in the embodiment shown in FIG. 6. In the embodiment, the feedthrough 100 extends along the displacement axis 195. By way of example, the displacement axis 195 is aligned parallel to the z axis. The feedthrough 100 can be designed, for example, in the form of an elongated hole or such that it is open in the z direction on one side. The feedthrough 100 has a feedthrough contour 200. One contact element 20, 50, 55 is arranged in each feedthrough 100, wherein the respective contact element 20, 50, 55 extends through the feedthrough 100 in the x direction in each case.

In the assembled state of the high current contact device 10, the first end face 80 of the first carrier 75 is facing a second end face 205 of the second carrier 175. In FIG. 6, the second end face 205 is arranged on a side of the second carrier 175 which is remote from the observer. The first end face 80 and the second end face 205 can be designed to be substantially planar, at least in certain regions.

Figure 7:
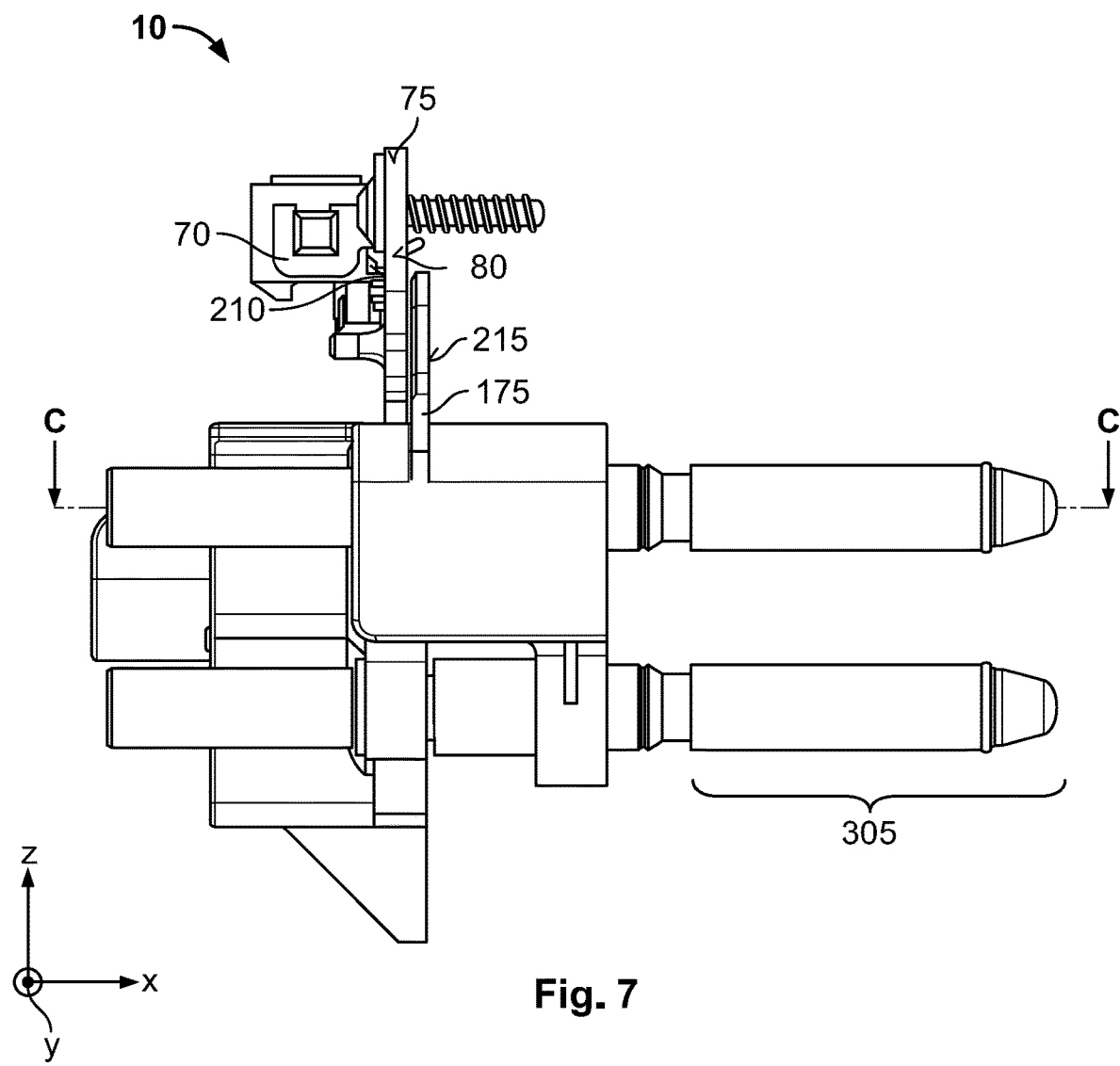
FIG. 7 is a side view of the high current contact device of FIG. 6.

FIG. 7 shows a side view of the high current contact device 10 shown in FIG. 6. In the embodiment, the interface 70 is arranged on a third end face 210 of the first carrier 75. A fourth end face 215 of the second carrier 175 is arranged on a side which is remote from the first carrier 75. The fourth end face 215 is designed to be substantially planar in the region of the contact elements 20, 50, 55 and possibly the sub-region 176.

Figure 8:
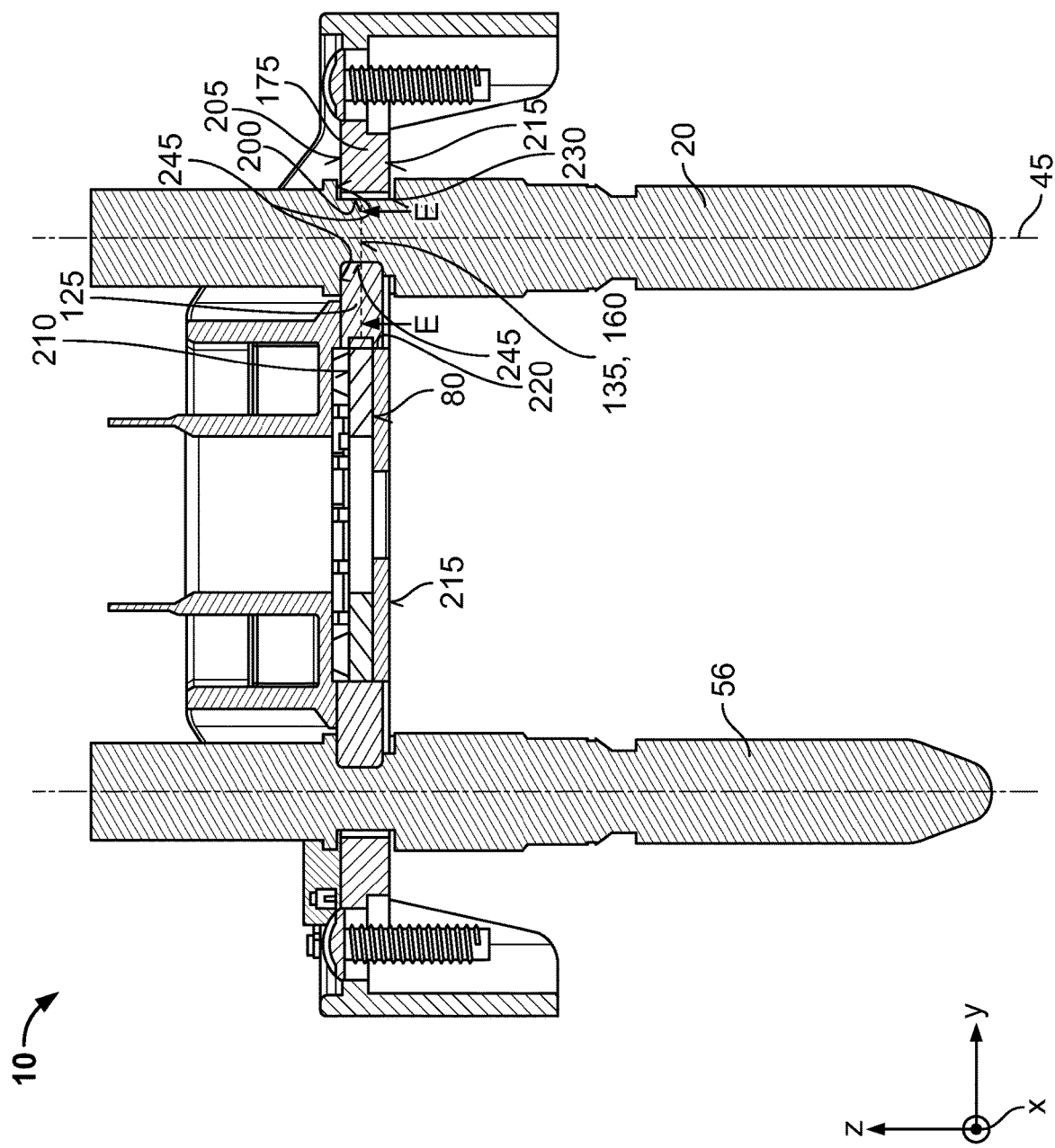
FIG. 8 is a sectional side view of the high current contact device shown in FIG. 7, along section plane C-C.

FIG. 8 shows a sectional view along a section plane C-C through the high current contact device 10 shown in FIGS. 6 and 7, which section plane is shown in FIG. 7. For reasons of clarity, the illustration of non-sectional components of the high current contact device 10 has not been included.

The second carrier 175 delimits at least one receptacle 220, as shown in FIG. 8. By way of example, the receptacle 220 is designed in the manner of a blind hole in the second carrier 175. In this case, the receptacle 220 is designed to be open at the fourth end face 215 and closed towards the second end face 205. A respective receptacle 220 is arranged in the second carrier 175 for each contact element 20, 50, 55. A first heat conducting element 125 is arranged in the receptacle 220 in each case.

In the embodiment, the first heat conducting element 125 is designed as a solid body, in particular as a cylinder. In an embodiment, the first heat conducting element 125 is fastened in the receptacle 220 with form fit, for example by an undercut, at least in part. The second outer circumferential side 160 can thus establish a friction fit with the receptacle 220, wherein the friction fit connects the first heat conducting element 125 to the second carrier 175. The contact surface 135 is arranged on the second outer circumferential side 160 of the first heat conducting element 125. By way of example, the first heat conducting element 125 can be designed to be shorter than the receptacle 220 in the axial direction as seen in relation to the mating axis 45.

The first contact element 20 has a groove 230 which is designed to extend circumferentially, as shown in FIG. 8, wherein the groove 230 has substantially the same axial width in the axial direction as the second carrier 175 at the groove 230. The groove 230 has a groove base 245, which is delimited laterally by groove side faces 250.

Figure 9:
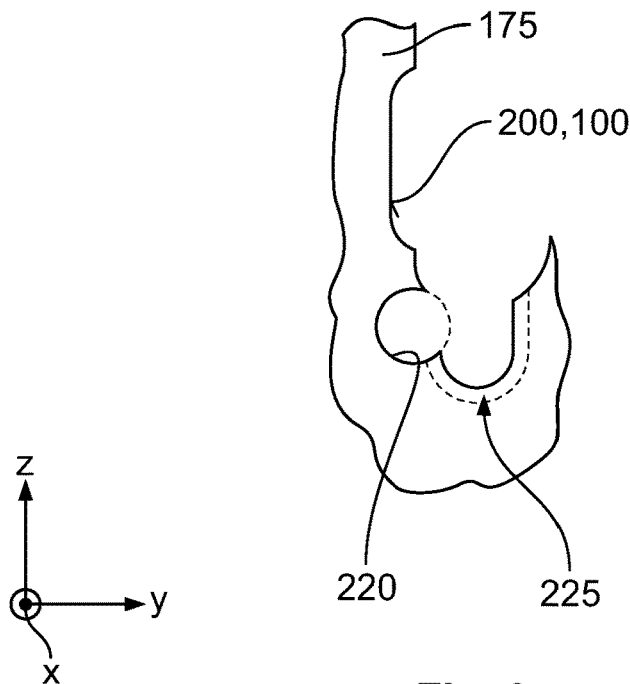
FIG. 9 is a detail side view of a second carrier of FIGS. 6 to 8.

FIG. 9 shows a detail of the second carrier 175 shown in FIGS. 6 to 8. The receptacle 220 adjoins the feedthrough 100. In this case, the receptacle 220 is positioned in the second carrier 175 such that the receptacle 220 leads laterally into the feedthrough 100. In this case, the receptacle 220 and the feedthrough contour 200 merge into one another.

The second carrier 175 has an engagement portion 225 adjacent to the feedthrough contour 200, as shown in FIG. 9. The second carrier 175 can be designed in the form of a plate, at least in the engagement portion 225. The engagement portion 225, in an embodiment, adjoins the receptacle 220 such that it is directly adjacent thereto.

Figure 10:
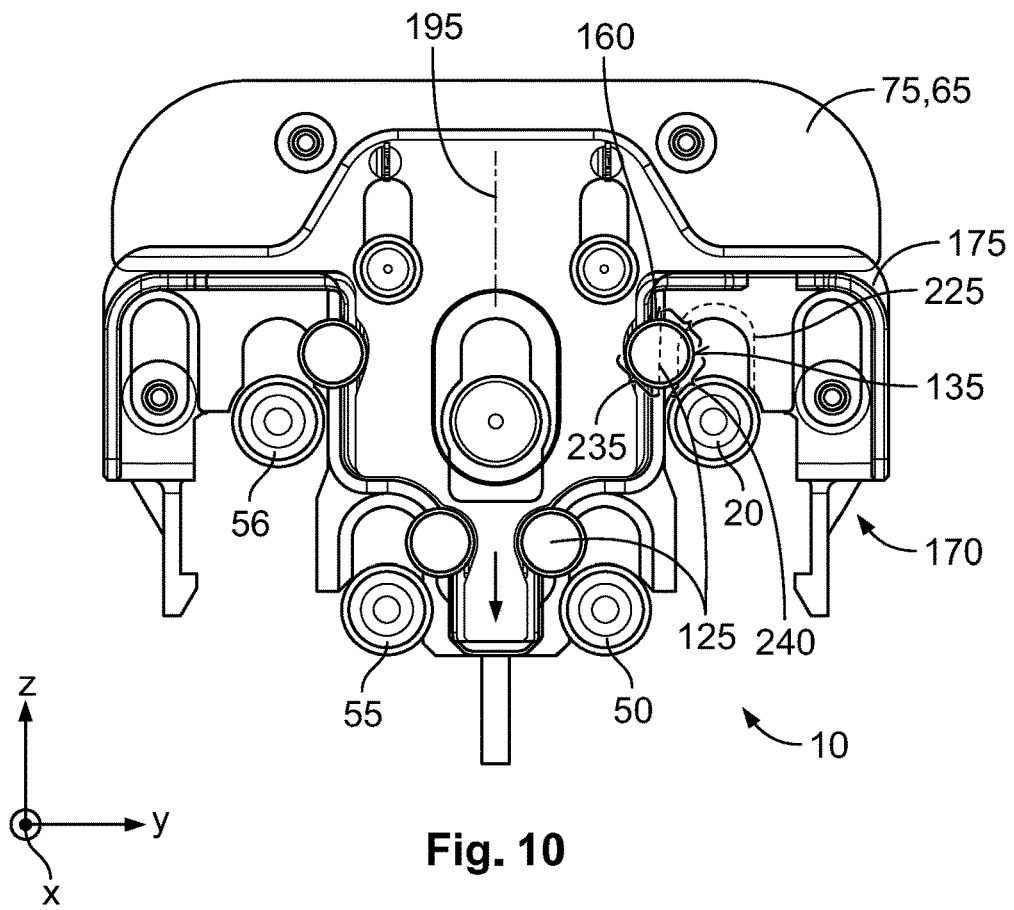
FIG. 10 is a plan view of the high current contact device of FIGS. 6 to 8.

FIG. 10 shows a plan view of the high current contact device 10 shown in FIGS. 6 to 9, wherein the contact securing device 170 is arranged in the first position. In the first position, the engagement portion 225 (marked by a dashed line in FIG. 10) is arranged such that it is spaced from the contact element 20, 50, 55. The second carrier 175 and the circuit carrier 65 are furthermore arranged such that they substantially overlap one another.

In the assembled state of the first heat conducting element 125 in the receptacle 220, a first section 235 is arranged in the receptacle 220. A second section 240 of the first heat conducting element 125 projects out of the receptacle 220 into the feedthrough 100. Circumferentially, the contact surface 135 is arranged on the second section 240. In this case, the second section 240 can be designed in the manner of a segment of a circle and is indicated by dashed lines in FIG. 10.

Figure 11:
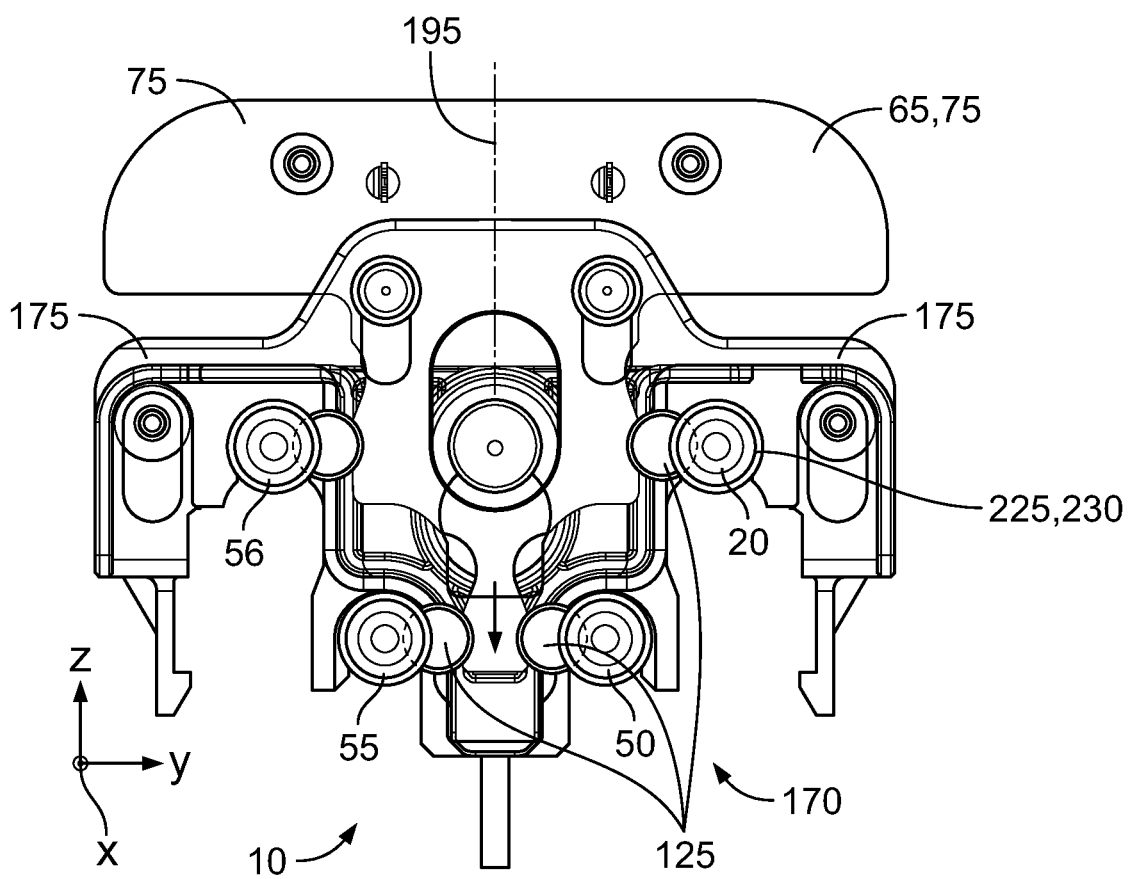
FIG. 11 is another plan view of the high current contact device of FIGS. 6 to 8.

FIG. 11 shows a plan view of the configuration of the high current contact device 10 which is shown in FIGS. 6 to 10. In contrast to the configuration shown in FIG. 10, the contact securing device 170 is arranged in the second position in FIG. 11. This means that the second carrier 175 is moved away from the circuit carrier 65. In this case, the engagement portion 225 engages in the groove 230 of the contact element 20, 50, 55, wherein a movement of the contact element 20, 50, 55 in the x direction is blocked as a result of the second end face 205 and/or the fourth end face 215 abutting or striking against one of the groove side faces 250 of the groove 230.

During the insertion of the contact securing device 170 and therefore the engagement portion 225 into the groove 230, the first heat conducting element 125 is also moved with the second carrier 175. In this case, the first heat conducting element 125 is introduced into the groove 230 and the first heat conducting element 125 is pressed into the groove 230. The contact surface 135 thus abuts well against the groove base 245 so that particularly good thermal contact between the first heat conducting element 125 and the contact element 20, 50, 55 is ensured.

As a result of the elastic deformation of the first heat conducting element 125, the first heat conducting element 125 can furthermore also abut with its end face against the groove side faces 250 of the groove 230. The surface for the heat transmission between the contact element 20, 50, 55 and the respectively associated first heat conducting element 125 is thus particularly large, so that the thermal contact resistance between the contact element 20, 50, 55 and the first heat conducting element 125 is particularly low.

Figure 12:
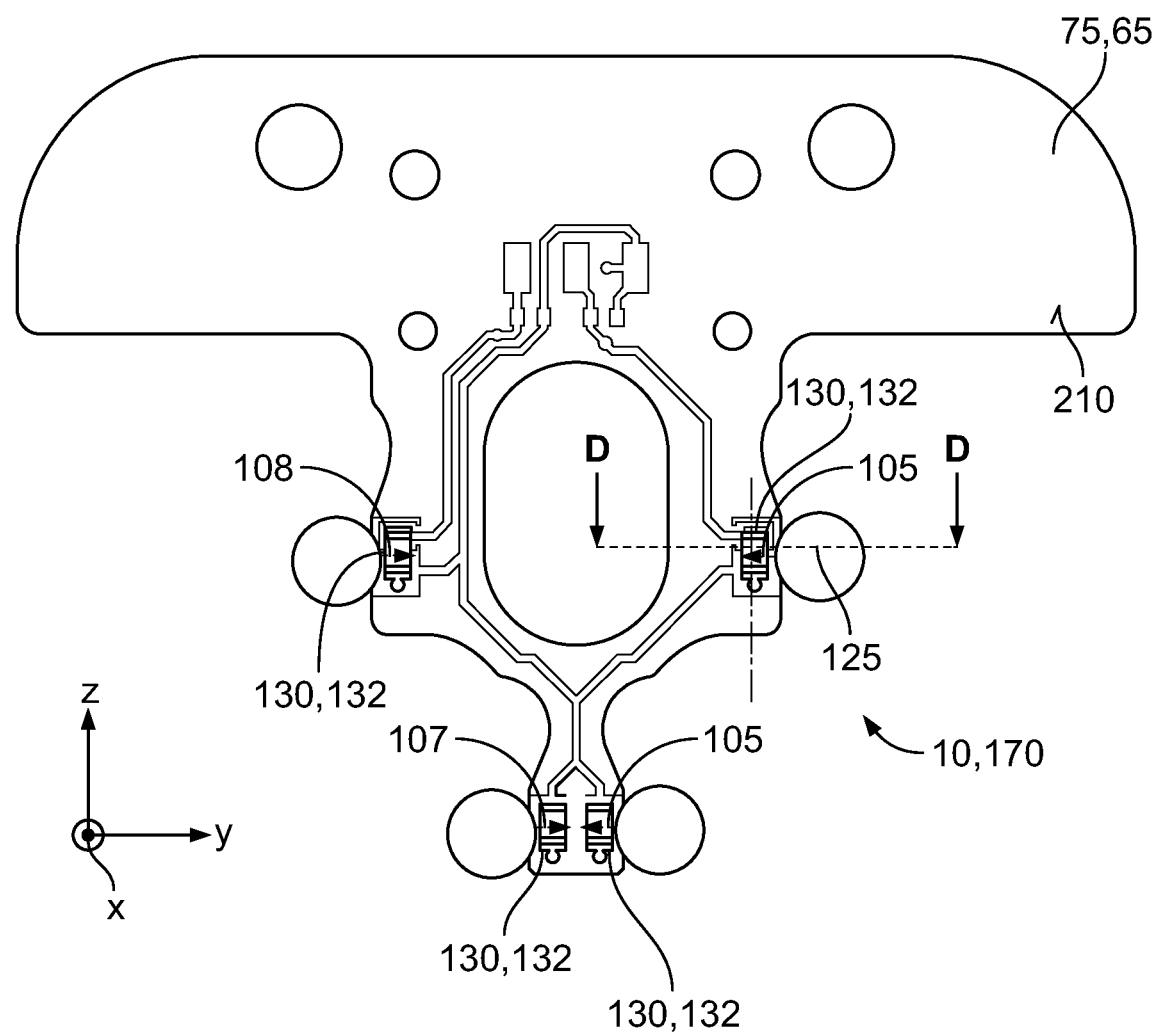
FIG. 12 is a plan view of a temperature measuring device of the high current contact device of FIGS. 6 to 11.

FIG. 12 shows a plan view of the temperature measuring device 25 of the high current contact device 10 in FIGS. 6 to 11, wherein the contact securing device is located in the second position. The temperature sensors 105, 106, 107, 108 are arranged internally with respect to the third end face 210 of the first carrier 75, for example. Each of the temperature sensors 105, 106, 107, 108 is electrically connected to the interface 70. This configuration has the advantage that the high current contact device 10 is particularly compact in the transverse direction.

The first carrier 75 additionally has the second heat conducting element 130, as shown in FIG. 12. The second heat conducting element 130 is designed such that it is integrated in the circuit carrier 65. In this case, the circuit carrier 65 can be designed, for example, as a multi-layer printed circuit board, wherein the second heat conducting element 130 is formed from at least one metallizing layer 132 on the first carrier 75 or at least one metallizing layer 132 in the second carrier 175. The metallizing layer 132 can have a layer thickness of 15 μm to 400 μm. The metallizing layer 132 can comprise copper and/or aluminum, for example, and is designed to be heat conducting.

Figure 13:
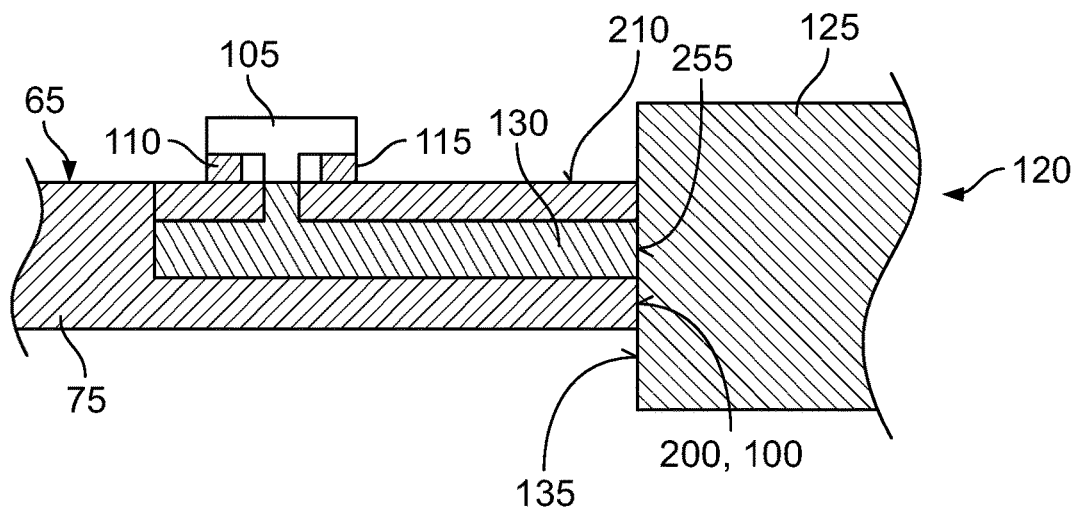
FIG. 13 is a sectional view of the high current contact device shown in FIG. 12, along section plane D-D.

FIG. 13 shows a sectional view along a section plane D-D through the high current contact device 10 shown in FIG. 12, which section plane is shown in FIG. 12. The second heat conducting element 130 ends at the feedthrough contour 200. The second heat conducting element 130 has a first heat coupling surface 255 laterally on the circuit carrier 65. The first heat coupling surface 255 is arranged at an angle, and in an embodiment perpendicularly, to the third end face 210 of the circuit carrier 65. The second heat conducting element 130 is thermally coupled to the first temperature sensor 105 on a side which is remote from the first heat coupling surface 255.

Figure 14:
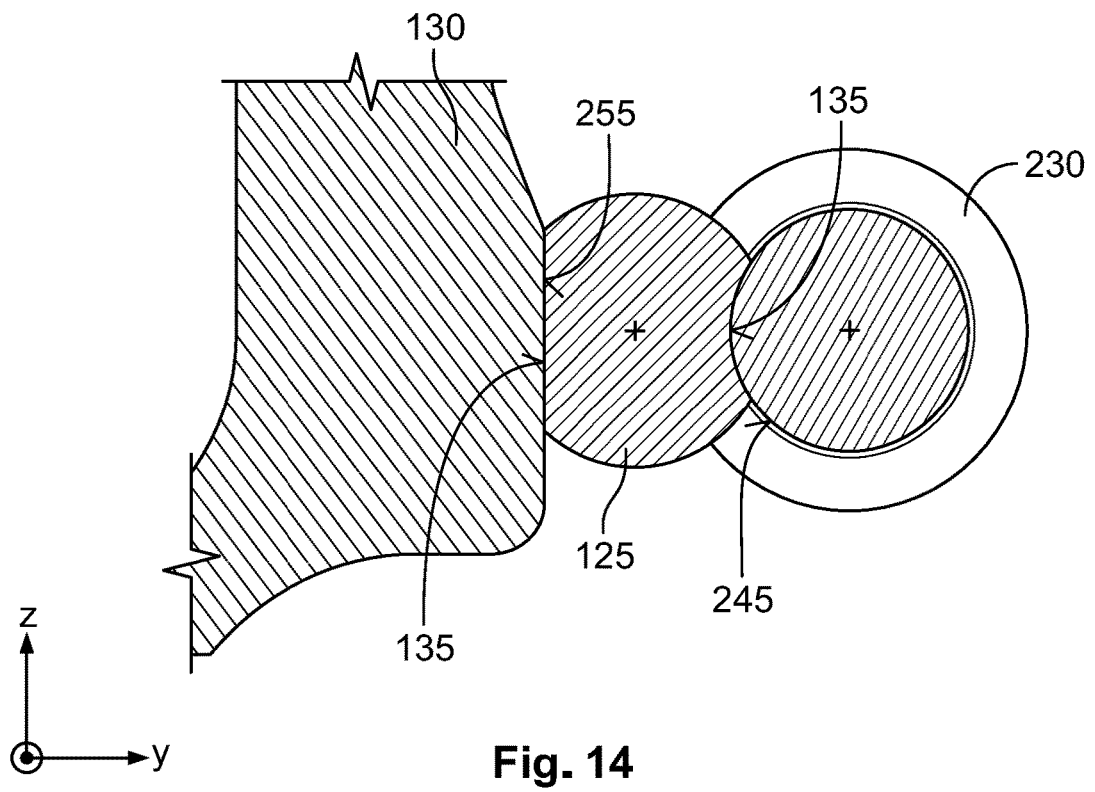
FIG. 14 is a detail sectional view of the high current device shown in FIG. 8, along section plane E-E.

FIG. 14 shows a detail of a sectional view along a section plane E-E through the high current contact device 10 shown in FIG. 8, which section plane is shown in FIG. 8. In the second position of the contact securing device 170, the first heat conducting element 125 is pressed against the first heat coupling surface 255 by the contact surface 135, so that the contact surface 135 and the first heat coupling surface 255 are thermally connected to one another. The first heat conducting element 125 nestles against the groove 230.

Figure 15:
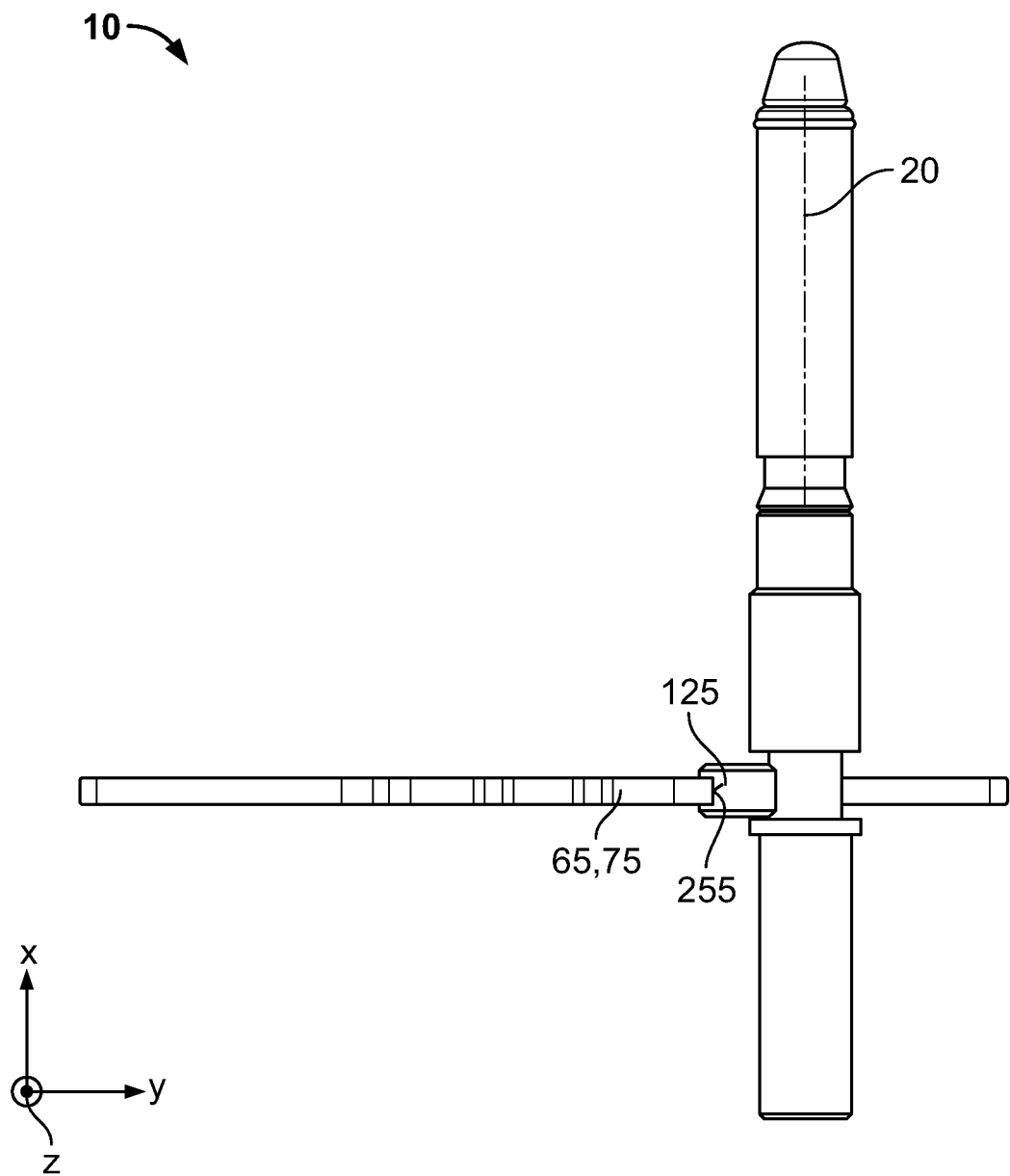
FIG. 15 is a side view of the high current contact device of FIGS. 7 to 14.

FIG. 15 shows a side view of the high current contact device 10 shown in FIGS. 7 to 14. For ease of understanding, only the first contact element 20, the first heat conducting element 125 and the circuit carrier 65 are illustrated in FIG. 15.

In the assembled state, the first heat conducting element 125 nestles against the first carrier 75 in the region of the first heat coupling surface 255, as shown in FIG. 15. In this case, the first heat conducting element 125 can be elastically deformed.

In particular, as a result of the contact surface 135 pressing against the first heat coupling surface 255, a thermal contact resistance between the first and second heat conducting element 125, 130 is kept particularly low. A thermal resistance of the first electrical heat conducting path 120 is thus particularly low.

In summary, therefore, the first heat conducting path 120 is closed in the second position and the first heat conducting path 120 is broken in the first position.

The explanations presented in relation to the first temperature sensor 105 likewise apply to the second temperature sensor 106 and the further temperature sensor 107, 108. In this case, the second temperature sensor 106 and the further temperature sensor 107, 108 are thermally connected to the associated contact element 50, 55 via the respectively associated first heat conducting path 120.

The contact element 20, 50, 55 heats up during the operation of the high current contact device 10, as already explained in FIGS. 1 to 5. As a result of the thermal coupling and the good thermal conductivity of both the first heat conducting element 125 and the second heat conducting element 130 formed from the metallizing layer 132, the temperature of the respectively associated contact element 20, 50, 55 can be measured in a precise and dynamic manner by the temperature sensor 105, 106, 107, 108. In particular, in the event of damage and/or in the event of corrosion of one of the contact elements 20, 50, 55, for example, overheating of one of the contact elements 20, 50, 55 can also be detected as a result of the temperature measurement of the respective contact element.

By integrating the first heat conducting element 125 in the contact securing device 170, the temperature sensor 105, 106, 107, 108 can be arranged such that it is spaced from the contact element 20, 50, 55, and a temperature difference between the temperature measured by the temperature sensor 105, 106, 107, 108 and the actual temperature of the contact element 20, 50, 55 is particularly small as a result of the above-described configuration of the high current contact device 10.

Furthermore, a time delay in the measurement of a temperature increase or a temperature drop in the contact element 20, 50, 55 is particularly small as a result of the particularly good thermal conductivity of the heat conducting path 120, which means that the temperature measuring device 25 shown in FIGS. 7 to 13 is particularly suitable for also determining the temperature of the contact element 20, 50, 55 in the case of a dynamic load, for example in the case of an alternating current load. A thermal overload of the contact element 20, 50, 55 can thus also be reliably detected in a particularly quick and early manner.

Figure 16:
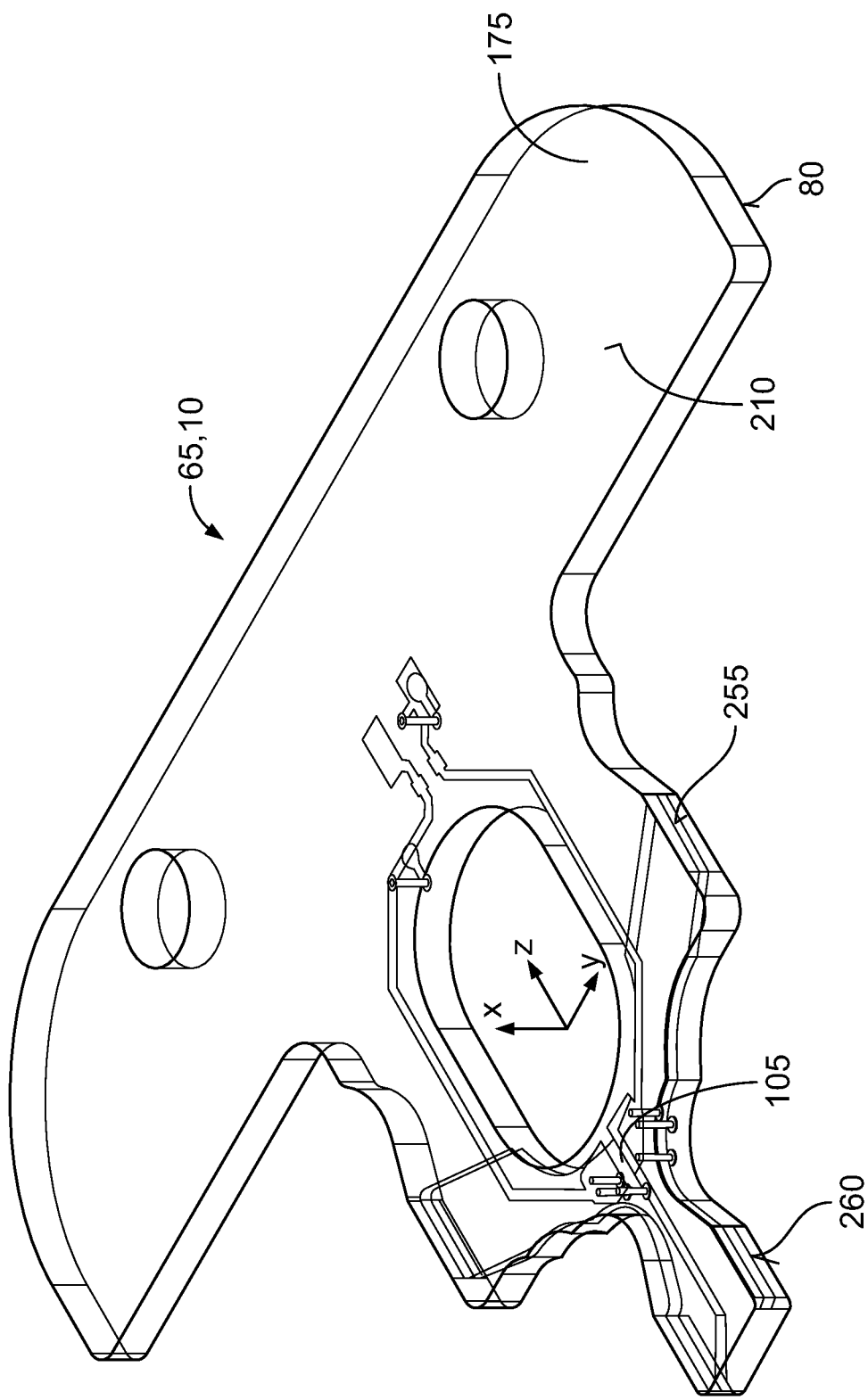
FIG. 16 is a perspective view of a circuit carrier of a high current contact device according to a third embodiment.

FIG. 16 shows a perspective illustration of the circuit carrier 65 of a high current contact device 10 according to a third embodiment. The high current contact device 10 is designed substantially identically to the high current contact device 10 shown in FIGS. 6 to 15. Only the differences of the high current contact device 10 shown in FIG. 16 or its temperature measuring device 25 compared to the configuration of the high current contact device 10 according to the second embodiment shown in FIGS. 6 to 15 are discussed below.

Figure 17:
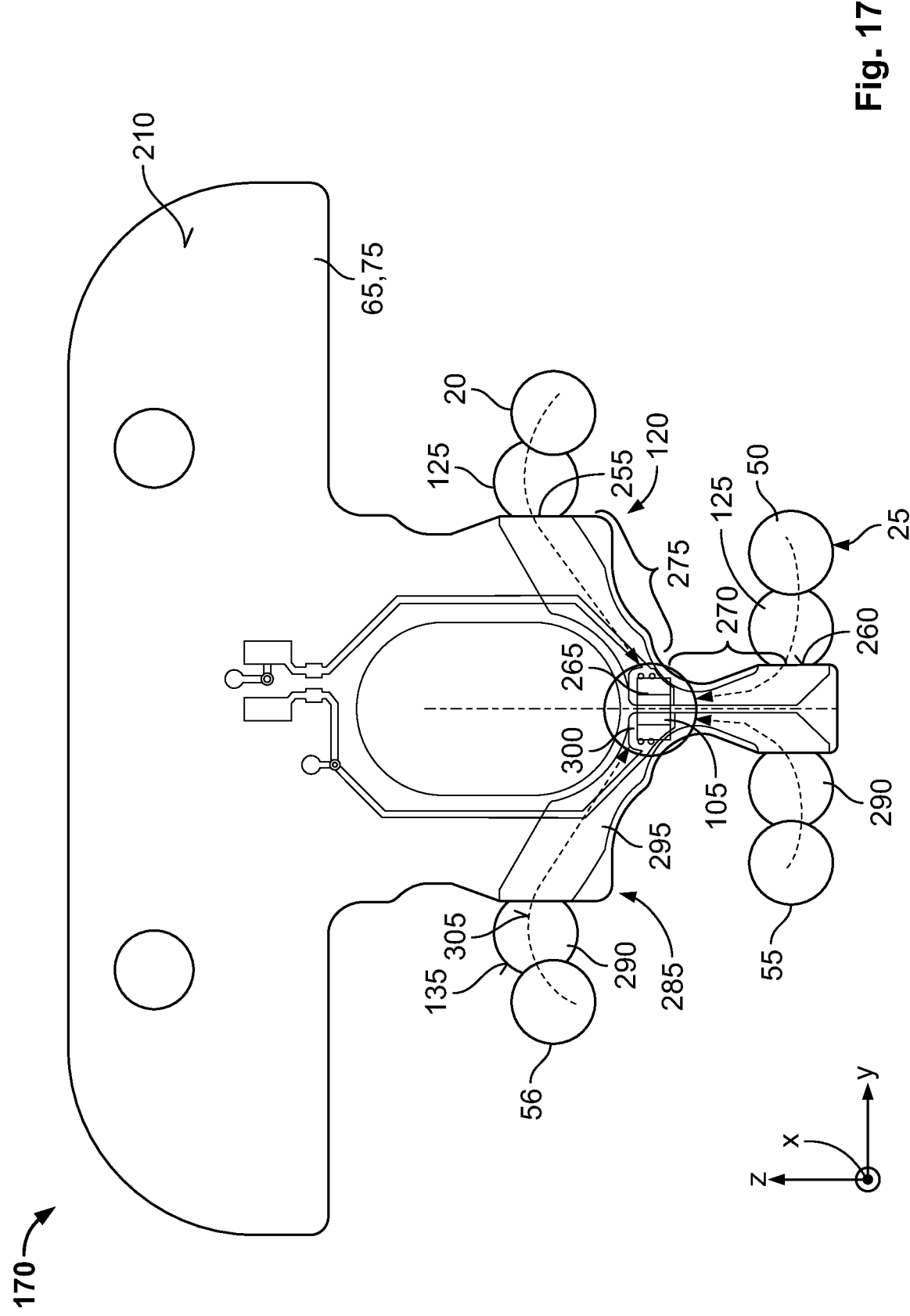
FIG. 17 is a plan view of a temperature measuring device of the high current contact device of FIG. 16.

In the embodiment shown in FIGS. 16 and 17, the temperature measuring device 25 only has the first temperature sensor 105. The further temperature sensors 106, 107, 108 have been omitted. In addition, the second heat conducting element 130 has a second heat coupling surface 260 in addition to the first heat coupling surface 255.

As shown in FIG. 16, the second heat coupling surface 260 is arranged laterally on the second carrier 175 and therefore arranged at an angle, in an embodiment perpendicularly, to the third end face 210 of the second carrier 75. In the embodiment, the first temperature sensor 105 is arranged such that it is substantially centered with respect to the arrangement of the four contact elements 20, 50, 55. In this case, the first heat coupling surface 255 and the second heat coupling surface 260 can be aligned parallel to one another. In an embodiment, the first heat coupling surface 255 and the second heat coupling surface 260 extend in an xz plane. By way of example, the first heat coupling surface 255 and/or the second heat coupling surface 260 are furthermore designed to be planar. It would also be conceivable for the first heat coupling surface 255 and/or the second heat coupling surface 260 to be formed concavely or convexly.

FIG. 17 shows a plan view of the temperature measuring device 25 of the high current contact device 10 shown in FIG. 16. The second heat conducting element 130 has a substantially V-shaped configuration with two limbs 270, 275. The second heat conducting element 130 thermally connects the first heat coupling surface 255 to the second heat coupling surface 260. A different configuration of the second heat conducting element 130 would also be possible. In this regard, the second heat conducting element 130 could also be designed to be arcuate, U-shaped or linear.

The second heat conducting element 130 has an extraction surface 265, shown in FIG. 17. The extraction surface 265 can be arranged, for example, on the third end face 210 of the circuit carrier 65. The extraction surface is arranged approximately at a branching point of the limbs 270, 275 of the second heat conducting element 130 in FIG. 17. A different arrangement of the extraction surface 265 would also be conceivable. At the extraction surface 265, the first temperature sensor 105 abuts against the second heat conducting element 130 and is thermally connected to the second heat conducting element 130. In addition, a thermally conductive material, for example a heat conducting paste, can be arranged between the first temperature sensor 105 and the extraction surface 265 in order to ensure a particularly good thermal connection between the first temperature sensor 105 and the extraction surface 265.

The second heat conducting element 130 thermally couples the first heat conducting element 125, which abuts against the first contact element 20 in the assembled state, and the first heat conducting element 125, which abuts against the second contact element 50 in the assembled state, to the first temperature sensor 105. This configuration has the advantage that the number of temperature sensors 105, 106, 107, 108 is reduced compared to the configurations shown in FIGS. 1 to 15.

In addition, the temperature measuring device 25 can have a second heat conducting path 285. By way of example, the second heat conducting path 285 is designed to be mirror-symmetrical with respect to the plane of symmetry 280 in FIG. 17, wherein the plane of symmetry 280 is designed as the xz plane which is arranged centrally with respect to the circuit carrier 65. The second heat conducting path 285 can also be designed in a different manner to that in FIG. 17. In particular, the second heat conducting path 285 can also be designed differently to the first heat conducting path 120.

The second heat conducting path 285 has a third heat conducting element 290 and a fourth heat conducting element 295, as shown in FIG. 17. In this case, the number of third heat conducting elements 290 corresponds substantially to the number of further contact elements 55. By way of example, the third heat conducting element 290 is designed identically to the first heat conducting element 125, as a solid body, and comprises both the first matrix material and the filler material so that the third heat conducting element 290 has a particularly good heat conductivity.

The fourth heat conducting element 295, shown in FIG. 17, is designed as a metallizing layer of the circuit carrier 65. The fourth heat conducting element 295 also has a configuration designed in a V-shape, for example, wherein a further extraction surface 300 is arranged on the third end face 210 at a vertex of the fourth heat conducting element 295. The first temperature sensor 105 is arranged on the further extraction surface 300 and thermally connected to the further extraction surface 300, which is arranged such that it is spaced from the extraction surface 265 in the y direction by a gap.

In the second position of the contact securing device 170, the third heat conducting element 290 abuts against the further contact element 55 and is thermally coupled to the further contact element 55. Furthermore, the fourth heat conducting element 295 is pressed laterally against the contact surface 135 of the third heat conducting element 290 by a third heat conducting surface in each case. The fourth heat conducting element 295 is thus thermally connected to the further contact element 55. The fourth heat conducting element 295 thermally connects the third heat conducting element 290 to the further extraction surface 300.

The first temperature sensor 105 is therefore connected to all contact elements 20, 50, 55 via the first heat conducting path 120 and via the second heat conducting path 285.

The heat transmission from the contact element 20, 50, 55 to the first temperature sensor 105 is illustrated by a dot and dash line in FIG. 17. If electric energy is transmitted via one of the contact elements 20, 50, 55, the respective contact element 20, 50, 55 heats up. The four contact elements 20, 50, 55 shown in FIG. 17 can transmit a three phase current; in this case, three of the contact elements 20, 50, 55 can be connected to a respective external conductor L1, L2, L3 and one of the contact elements 20, 50, 55 can be connected to an earth conductor N.

The heated first and second contact element 20, 50 heats the respective first heat conducting element 125 abutting against the associated first and second contact element 20, 50. The first heat conducting element 125 transfers the heat to the second heat conducting element 130 via the first heat coupling surface 255. As a result of the metallic material of the second heat conducting element 130, this is particularly heat conductive and transfers the heat particularly quickly from the first heat conducting element 125 to the extraction surface 265 for the temperature sensor 105.

The second heat conducting path 285, shown in FIG. 17, couples the further contact element 55 to the first temperature sensor 105. In this case, the heat from the heated further contact element 55 is transferred to the fourth heat conducting element 295 via the third heat conducting element 290 abutting against the further contact element 55. The fourth heat conducting element 295 transfers the heat to the further extraction surface 300 at which the first temperature sensor 105 is thermally connected to the fourth heat conducting element 295.

The first temperature sensor 105 measures the temperature applied at the extraction surface 265 and/or at the further extraction surface 300 and provides corresponding information relating to the measured temperature to the interface 70. In this case, the first temperature sensor 105 substantially always measures the temperature of the hottest contact element 20, 50, 55.

This configuration has the advantage that the third embodiment shown in FIGS. 16 and 17 is particularly cost effective as a result of the reduced number of temperature sensors compared to the embodiments shown in FIGS. 1 to 15. Furthermore, the temperature of the contact elements 20, 50, 55 can be monitored in a particularly precise and dynamic manner despite the reduced number of temperature sensors.

Figure 18:
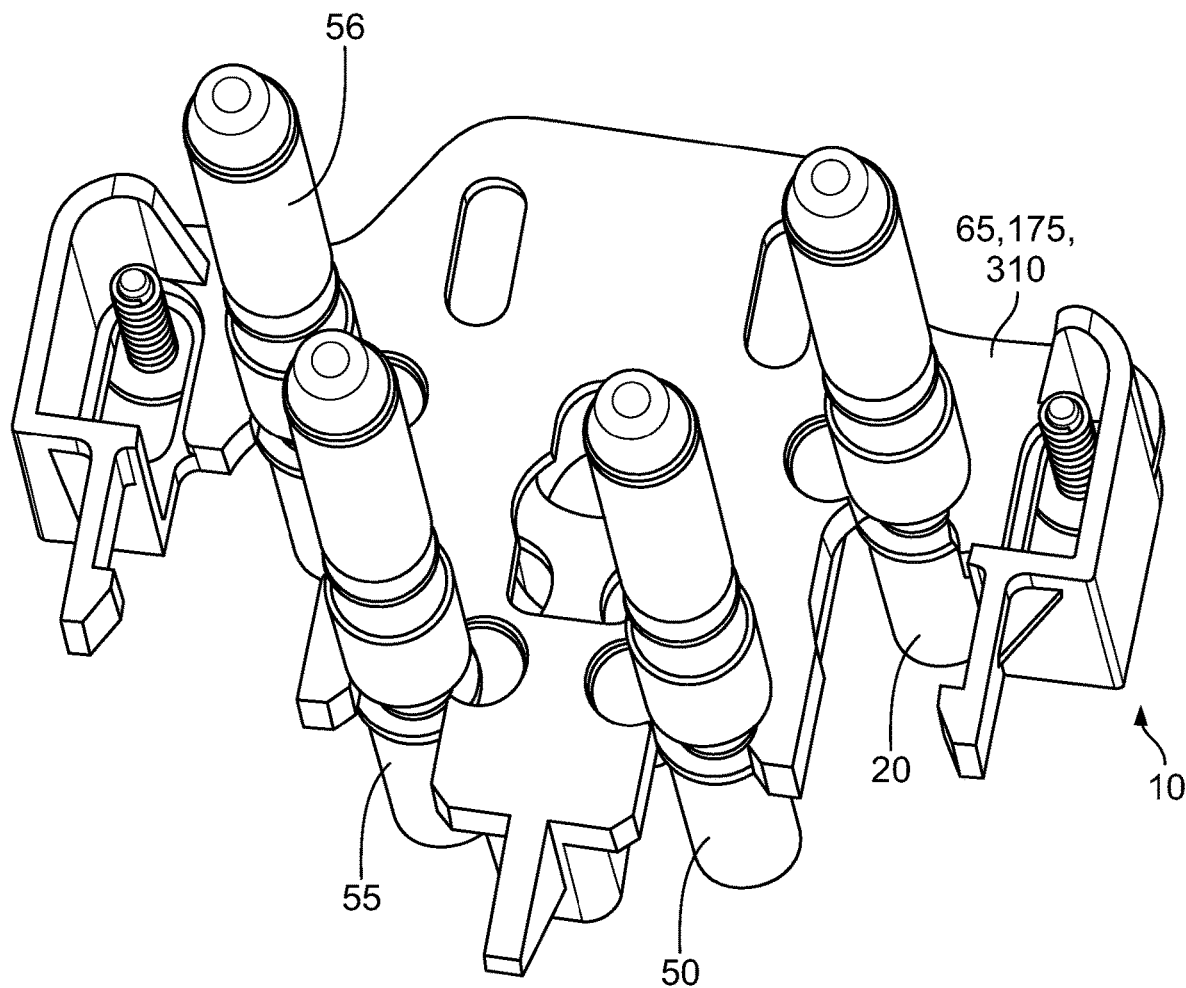
FIG. 18 is a perspective view of a high current contact device according to a fourth embodiment.

FIG. 18 shows a perspective illustration of a high current contact device 10 according to a fourth embodiment. The high current contact device 10 is designed substantially identically to the high current contact device 10 shown in FIGS. 6 to 15. Only the differences of the fourth embodiment of the high current contact device 10 shown in FIG. 18 compared to the high current contact device 10 shown in FIGS. 6 to 15 are discussed below.

The circuit carrier 65 shown in FIGS. 6 to 15 and the second carrier 175 are designed as an integrated circuit carrier 310 in FIG. 18. In this case, by way of example, the first carrier 75 and the second carrier 175 are designed in one piece and from the same material. Traces of the circuit carrier 65 are designed, for example, as metallizing layers on the integrated circuit carrier 310. In an embodiment, the integrated circuit carrier 310 is designed, for example, as an injection molded circuit carrier (also known as a molded integrated device, MID for short).

This configuration has the advantage that the two-part configuration of the contact securing device 170 of the circuit carrier 65, as shown in FIGS. 6 to 15, can be omitted.

Figure 19:
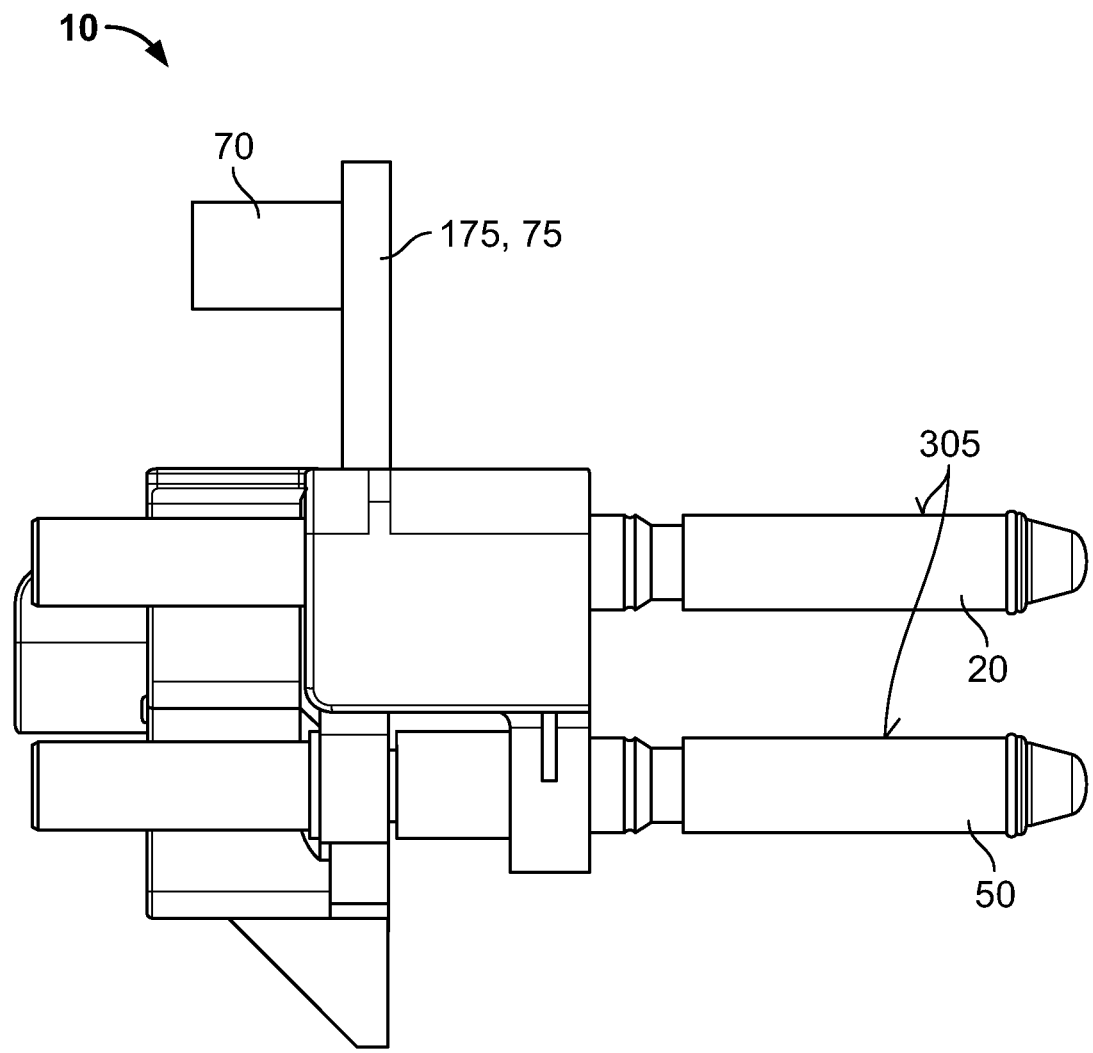
FIG. 19 is a side view of the high current contact device of FIG. 18.

FIG. 19 shows a side view of the high current contact device 10 shown in FIG. 18. In the embodiment, the interface 70 is arranged by way of example on a side of the contact element 20, 50, 55 which is remote from the contact region 305. In this case, the interface 70 can be arranged on the integrated circuit carrier 310.

Figure 20:
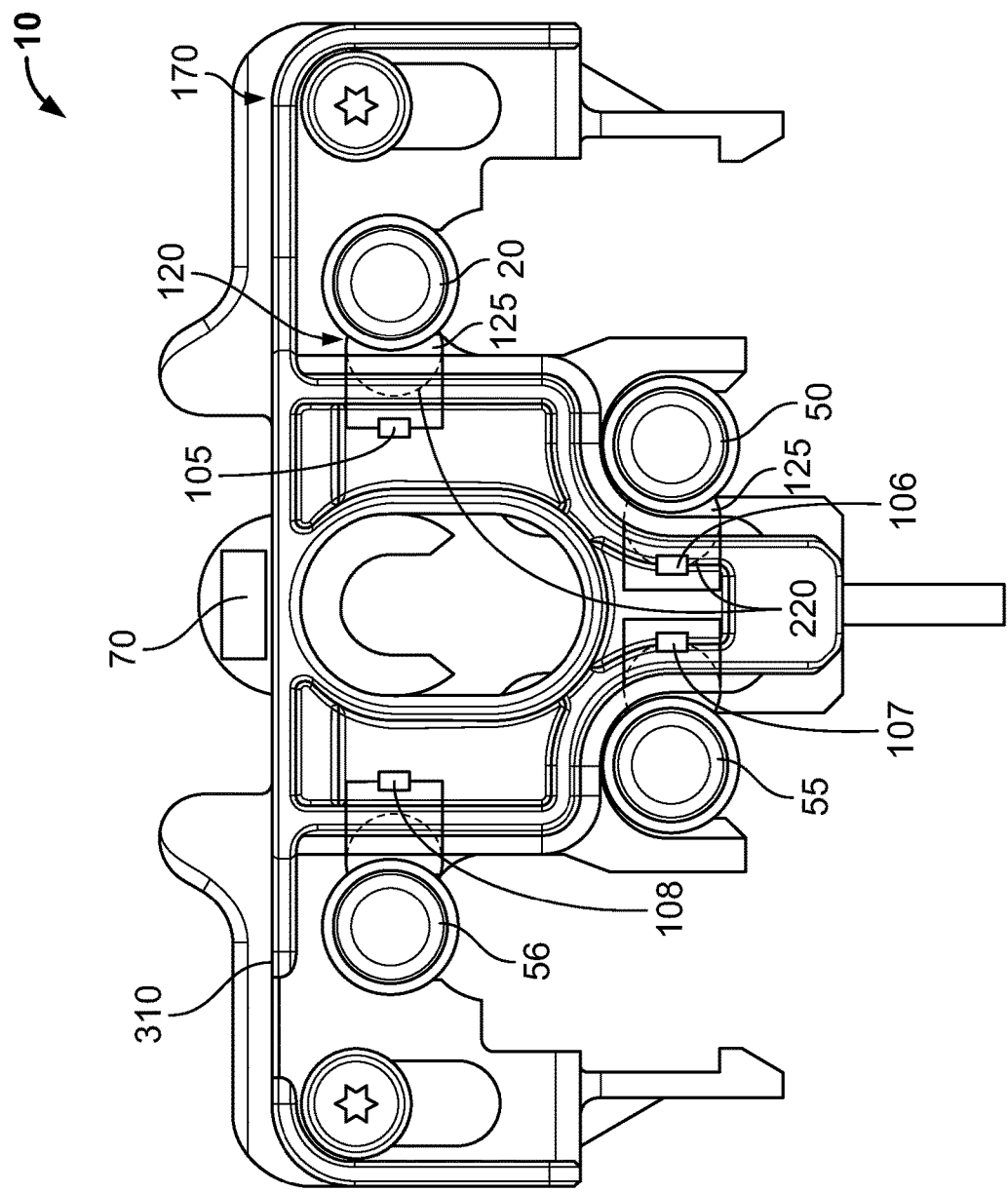
FIG. 20 is a rear view of the high current contact device of FIGS. 18 and 19.

FIG. 20 shows a rear view of the high current contact device 10 shown in FIGS. 18 and 19. Traces on the integral circuit carrier 310 are omitted in FIG. 20 for reasons of clarity. In the embodiment, each contact element 20, 50, 55 is thermally connected to the respectively associated temperature sensor 105, 106, 107, 108 via the first heat conducting path 120 in each case. In contrast to the configuration as a metallizing layer shown in FIGS. 6 to 15, the second heat conducting element 130 is formed on or in the integral carrier 310 and thermally couples the temperature sensor 105, 106, 107, 108 respectively to the first heat conducting element 125 in each case.

This configuration has the advantage that an assembly force for displacing the contact securing device 170 from the first position to the second position and for assembling it on the contact elements 20, 50, 55 is substantially halved compared to the configuration shown in FIGS. 6 to 15 since the first heat conducting element 125 is only pressed onto the respectively associated contact element 20, 50, 55 and pressing does not take place when sliding the contact securing device 170 onto the second heat conducting element 130.

The fourth embodiment shown in FIGS. 18 to 20 furthermore has the advantage that the component count is reduced as a result of the integral circuit carrier 310, and the high current contact device 10 is thus designed in a particularly simple and cost effective manner. Furthermore, a geometry of the integrated circuit carrier 310 can be designed substantially freely.

Furthermore, the temperature sensor 105, 106, 107, 108 can be positioned in a thermally optimized manner; in an embodiment as close as possible to the associated contact element 20, 50, 55.

The embodiment shown in FIGS. 18 to 20 can also be combined with the third embodiment shown in FIGS. 15 to 17. Furthermore, further electrical components, for example LEDs, can be positioned in/on the integrated circuit carrier. The components and/or the temperature sensor 105, 106, 107, 108 can be soldered at the electrical connection 110, 115, 116. A reflow process, for example, can be used for this purpose. The temperature sensor 105, 106, 107, 108 can also be electrically and mechanically connected to the electrical connection 110, 115, 116 by of an electrically conductive adhesive, e.g. a silver conductive adhesive.

What is claimed is:

1. A high current contact device for transmitting electric energy, comprising:
   a contact housing;
   a first contact element arranged in the contact housing, the first contact element extends at least in portions along a mating axis;
   a temperature measuring device having a circuit carrier with a first temperature sensor and a first heat conducting path, the first temperature sensor is arranged on the circuit carrier and the circuit carrier is arranged laterally adjacent to the first contact element, the first heat conducting path has a first heat conducting element that is elastic and heat conductive with a contact surface, the contact surface abuts against a first outer circumferential side of the first contact element, the first heat conducting element thermally couples the first contact element to the first temperature sensor, the first temperature sensor measures a temperature of the first contact element; and a contact securing device with a second carrier that is displaceable between a first position and a second position.

2. The high current contact device of claim 1, wherein the first heat conducting element is pressed against the first outer circumferential side by the first contact surface, the first heat conducting element has an elastic deformation of at least 10 percent at least in a region adjacent to the contact surface.

3. The high current contact device of claim 1, wherein the circuit carrier has a feedthrough, the first contact element extends through the feedthrough, the first heat conducting element is arranged adjacent to the feedthrough on the circuit carrier and is connected to the circuit carrier with a material fit.

4. The high current contact device of claim 1, wherein the first heat conducting element is formed as a ring or a hollow cylinder, the contact surface is arranged on an inner circumferential side of the first heat conducting element and extends continuously around the mating axis.

5. The high current contact device of claim 4, wherein the contact surface abuts against the first outer circumferential side of the first contact element in a sealing manner.

6. The high current contact device of claim 5, wherein the first heat conducting element has a supporting web extending from radially inwards to radially outwards and arranged on a side of the first heat conducting element that is remote from the contact surface in relation to the mating axis.

7. The high current contact device of claim 5, wherein the first heat conducting element has a plurality of supporting webs arranged offset from one another in a circumferential direction in relation to the mating axis.

8. The high current contact device of claim 1, wherein the first temperature sensor is connected to the first heat conducting element with a material fit.

9. The high current contact device of claim 1, wherein the first heat conducting path has a second heat conducting element arranged on the circuit carrier, the second heat conducting element has at least one metallizing layer on and/or in the circuit carrier, the second heat conducting element is thermally coupled to the first temperature sensor and the second heat conducting element thermally connects the first heat conducting element to the first temperature sensor.

10. The high current contact device of claim 9, wherein the second heat conducting element has a heat coupling surface laterally on the circuit carrier for contacting the first heat conducting element, the heat coupling surface is arranged at an angle to an end face of the circuit carrier.

11. The high current contact device of claim 3, wherein the feedthrough is a bore and the first heat conducting path has a second heat conducting element formed as at least a part of a ring around the feedthrough.

12. The high current contact device of claim 1, wherein the first heat conducting element has a matrix material including at least silicone and/or polyethylene and/or polyurethane, at least one of the following filler materials is embedded in the matrix material; aluminum oxide, aluminum nitrate, silicon oxide, silicon nitrate, boron, electrically conducting metal, and an electrically non-conducting and thermally conductive metal compound.

13. The high current contact device of claim 9, wherein the second heat conducting element includes aluminum and/or copper.

14. The high current contact device of claim 1, wherein the second carrier releases the first contact element in the first position and secures the first contact element against removal in the second position.

15. The high current contact device of claim 14, wherein the first heat conducting element is fastened on the second carrier, the first heat conducting element is spaced from the first outer circumferential side of the first contact element in the first position and the contact surface abuts the first outer circumferential side and is thermally connected to the first outer circumferential side in the second position.

16. The high current contact device of claim 15, wherein the second carrier has a receptacle arranged adjacent to a feedthrough of the circuit carrier, the first heat conducting element is arranged with a first section in the receptacle and projects from the receptacle into the feedthrough with a second section, the contact surface is arranged on the second section.

17. The high current contact device of claim 1, further comprising a second contact element arranged offset from the first contact element in a direction perpendicular to the mating axis.

18. The high current contact device of claim 17, wherein the temperature measuring device has a second heat conducting path thermally connecting the first temperature sensor to the second contact element.

19. The high current contact device of claim 18, wherein the circuit carrier is a printed circuit board or an injection molded circuit carrier.

20. The high current contact device of claim 1, wherein the first heat conducting element is formed as a cylinder or as a solid body, the contact surface of the first heat conducting element is arranged on a second outer circumferential side of the first heat conducting element.

21. A high current contact device for transmitting electric energy, comprising:

a contact housing;

a first contact element arranged in the contact housing, the first contact element extends at least in portions along a mating axis;

a temperature measuring device having a circuit carrier with a first temperature sensor and a first heat conducting path, the first temperature sensor is arranged on the circuit carrier and the circuit carrier is arranged laterally adjacent to the first contact element, the first heat conducting path has a first heat conducting element that is elastic and heat conductive with a contact surface, the contact surface abuts against a first outer circumferential side of the first contact element, the first heat conducting element thermally couples the first contact element to the first temperature sensor, the first temperature sensor measures a temperature of the first contact element; and a second contact element arranged offset from the first contact element in a direction perpendicular to the mating axis, the temperature measuring device has a second heat conducting path thermally connecting the first temperature sensor to the second contact element.

\* \* \* \* \*